US007805345B2

(12) United States Patent
Abrahams et al.

(10) Patent No.: US 7,805,345 B2
(45) Date of Patent: Sep. 28, 2010

(54) COMPUTER-IMPLEMENTED LENDING ANALYSIS SYSTEMS AND METHODS

(75) Inventors: Clark R. Abrahams, Cary, NC (US); Mingyuan Zhang, Cary, NC (US)

(73) Assignee: SAS Institute Inc., Cary, NC (US)

( * ) Notice: Subject to any disclaimer, the term of this patent is extended or adjusted under 35 U.S.C. 154(b) by 1104 days.

(21) Appl. No.: 11/212,289

(22) Filed: Aug. 26, 2005

(65) Prior Publication Data
US 2007/0050286 A1    Mar. 1, 2007

(51) Int. Cl.
*G06Q 40/00* (2006.01)
(52) U.S. Cl. .......................... 705/35; 705/37
(58) Field of Classification Search ............. 705/1, 705/35, 37, 80, 51, 57, 38; 510/301, 101, 510/446; 707/101, 102, 3
See application file for complete search history.

(56) References Cited

U.S. PATENT DOCUMENTS

| | | | |
|---|---|---|---|
| 5,568,400 A * | 10/1996 | Stark et al. ................. 702/85 |
| 6,643,625 B1 | 11/2003 | Acosta et al. | |
| 2003/0036994 A1 | 2/2003 | Witzig et al. | |
| 2003/0046223 A1 | 3/2003 | Crawford et al. | |
| 2003/0229581 A1 | 12/2003 | Green et al. | |
| 2004/0199456 A1 | 10/2004 | Flint et al. | |
| 2006/0265258 A1* | 11/2006 | Powell et al. ................ 705/7 |

OTHER PUBLICATIONS

"Making New Mortgage Markets: Case Studies of Institutions, Home Buyers, and Communities"—David Listokin and Elvin K. Wyly, Fannie Mae Foundation—Housing Policy Debate, vol. 11, Issue 3, 2000.*
"Multivalued Associative Memories Based on Recurrent Networks"—TZi-Dar Chiueh and Hung-Kai Tsai—IEEE Transactions on Neural Networks, vol. 4, No. 2—Mar. 1993.*
"Measurement Problems in Cluster Analysis"—Donald G. Morrison—Management Science, vol. 13, No. 12, Series B. Managerial,—Aug. 1967. pp. B775-B780.*
"A Disconnect in Stakeholders' Perceptions from Cmerging Realities of Teledensity Growth in Africa's Least Developed Countries" by: Victor W. Mbarika; Peter N. Meso; Hilip F. Musa—Journal of Global Information Management; Jul.-Sep. 2004; 12, 3; ABI/INFORM Global.*

* cited by examiner

*Primary Examiner*—Mary Cheung
*Assistant Examiner*—John H Holly
(74) *Attorney, Agent, or Firm*—Jones Day

(57) ABSTRACT

In accordance with the teachings described herein, computer-implemented lending analysis systems and methods are provided. A pre-processing module may be used to organize loan applicant data into a plurality of applicant groups based on one or more demographic factors, wherein a protected class is identified from the plurality of applicant groups. An index generation module may be used to calculate a plurality of disparity indices for the protected class by comparing lending-related data for the protected class with lending-related data for one or more control groups selected from the applicant groups. An indicator generation module may be used to calculate one or more singular indicators for the protected class by comparing the disparity indices with one or more reference indices. The indicator generation module may be further used to calculate a global indicator as a function of a plurality of singular indicators.

42 Claims, 21 Drawing Sheets

| MSA | STATE CODE | COUNTY CODE | CENSUS TRACT | MINORITY POPULATION | NON-HISPANIC BLACK | NON-HISPANIC WHITE | TOTAL HAWAIIAN | TOTAL OTHER MORE RACES |
|---|---|---|---|---|---|---|---|---|
| 49740 | 04 | 027 | 0001.00 | 2074 | 87 | 724 | 0 | 5 |
| 49740 | 04 | 027 | 0002.00 | 3020 | 102 | 906 | 0 | 1 |
| 49740 | 04 | 027 | 0003.01 | 3007 | 133 | 832 | 0 | 1 |
| 49740 | 04 | 027 | 0003.02 | 4015 | 175 | 698 | 0 | 0 |
| 49740 | 04 | 027 | 0004.01 | 4064 | 51 | 2022 | 0 | 4 |
| 49740 | 04 | 027 | 0004.02 | 3056 | 54 | 507 | 0 | 3 |
| 49740 | 04 | 027 | 0005.00 | 3251 | 142 | 3953 | 6 | 11 |
| 49740 | 04 | 027 | 0006.00 | 3193 | 156 | 2483 | 8 | 11 |
| 49740 | 04 | 027 | 0007.00 | 3792 | 107 | 1066 | 0 | 3 |
| 49740 | 04 | 027 | 0008.00 | 2808 | 117 | 2687 | 0 | 4 |

112

| LOAN_NUM | LOAN_PURPOSE | LIEN_STATUS | MSA | STATE CODE | JOINT RACE | APPROVAL TYPE | LOAN-TO-VALUE RATIO | LOAN AMOUNT | APPLICANT INCOME | FICO SCORE |
|---|---|---|---|---|---|---|---|---|---|---|
| 2368 | REFINANCE | JUNIOR LIEN | 49740 | 04 | NON-HISPANIC WHITE | ORIGINATED | 0.7665 | 148604 | 133263 | 663 |
| 2369 | HOME PURCHASE | FIRST LIEN | 49740 | 04 | BLACK OR AFRICAN AMERICAN | DENIED | 0.9412 | 163281 | 80255 | 646 |
| 2370 | REFINANCE | FIRST LIEN | 49740 | 04 | NATIVE HAWAIIAN/OTHER PACIFIC ISLAND | ORIGINATED | 0.8954 | 192718 | 121217 | 762 |
| 2371 | HOME PURCHASE | FIRST LIEN | 49740 | 04 | BLACK OR AFRICAN AMERICAN | ORIGINATED | 0.6662 | 224904 | 139140 | 559 |
| 2372 | HOME PURCHASE | FIRST LIEN | 49740 | 04 | AMERICAN INDIAN/ALASKA NATIVE | ORIGINATED | 0.8707 | 180095 | 169239 | 750 |
| 2373 | REFINANCE | JUNIOR LIEN | 49740 | 04 | NON-HISPANIC WHITE | ORIGINATED | 0.6256 | 168632 | 111775 | 672 |
| 2374 | REFINANCE | JUNIOR LIEN | 49740 | 04 | NON-HISPANIC WHITE | DENIED | 0.7846 | 209503 | 111358 | 701 |
| 2375 | REFINANCE | FIRST LIEN | 49740 | 04 | NATIVE HAWAIIAN/OTHER PACIFIC ISLAND | ORIGINATED | 0.9708 | 150207 | 101726 | 771 |
| 2376 | REFINANCE | JUNIOR LIEN | 49740 | 04 | NON-HISPANIC WHITE | FALLOUT | 0.8472 | 199244 | 129937 | 574 |
| 2377 | REFINANCE | JUNIOR LIEN | 49740 | 04 | NON-HISPANIC WHITE | ORIGINATED | 0.5555 | 215496 | | |

Fig. 6

CHI-SQUARE TESTS
THE FREQ PROCEDURE

TABLE OF TRACT_MINORITY_STATUS BY APPROVAL_TYPE — 113

| TRACT_MINORITY_STATUS | APPROVAL_TYPE(ORIGINATED/DENIED/FALLOUT) | | | | |
|---|---|---|---|---|---|
| | ORIGINATED | FALLOUT | DENIED | OTHERS | TOTAL |
| WHITE NON-HISPANICS | 8051<br>8119<br>0.5703<br>40.38<br>76.76<br>52.17 | 1976<br>1818.7<br>13.61<br>9.91<br>18.84<br>57.16 | 461<br>549.23<br>14.174<br>2.31<br>4.40<br>44.16 | 0<br>1.0522<br>1.0522<br>0.00<br>0.00<br>0.00 | 10488<br><br><br><br>52.61<br> |
| ALL OTHERS, INCLUDING HISPANICS | 7382<br>7314<br>0.6331<br>37.03<br>78.13<br>47.83 | 1481<br>1638.3<br>15.108<br>7.43<br>15.68<br>42.84 | 583<br>494.77<br>15.734<br>2.92<br>6.17<br>55.84 | 2<br>0.9478<br>1.168<br>0.01<br>0.02<br>100.00 | 9448<br><br><br><br>47.39<br> |
| TOTAL | 15433<br>77.41 | 3457<br>17.34 | 1044<br>5.24 | 2<br>0.01 | 19936<br>100.00 |

FREQUENCY
EXPECTED
CELL CHI-SQUARE
PERCENT
ROW PCT
COL PCT

| CLASS | PROTECTED | CONTROL |
|---|---|---|
| RACE AND ETHNICITY | | |
| WHITE NON-HISPANIC | | X |
| ALL OTHER | X | |
| EITHER N/A | NOT PROTECT, BUT DO TEST FOR SIGNIFICANCE | DO NOT INCLUDE, EVEN IF WHITE WITH ETHNICITY N/A |
| GENDER | FEMALE | MALE |
| AGE | 62 AND OVER | UNDER 62 |

| CLASS | PROTECTED | CONTROL |
|---|---|---|
| RACE AND ETHNICITY | | |
| BOTH WHITE NON-HISPANIC | | X |
| ALL OTHER GROUPS - BOTH SAME | X | |
| ALL OTHER GROUPS - MIXED INCL. EITHER RACE OR ETHNICITY N/A | X | |
| BOTH RACE AND ETHNICITY N/A | NOT PROTECT, BUT DO TEST FOR SIGNIFICANCE | |
| GENDER | BOTH FEMALE | |
| OTHER COMBO | | X |
| BOTH N/A | NOT PROTECT, BUT DO TEST FOR SIGNIFICANCE | |
| AGE | PRIMARY BORROWER 62+ | |
| OTHER COMBO | | X |
| BOTH N/A | NOT PROTECT, BUT DO TEST FOR SIGNIFICANCE | |

| JOINT RACE | MSA | TOTAL MINORITY POPULATION | TOTAL POPULATION | PCT MINORITY POP |
|---|---|---|---|---|
| ASIAN | 41900 | 88 | 188386 | 0.00047 |
| BLACK OR AFRICAN AMERICAN | 41900 | 139 | 188386 | 0.00074 |
| NATIVE HAWAIIAN/OTHER PACIFIC ISLAND | 41900 | 0 | 188386 | 0.00000 |
| HISPANIC WHITE | 41900 | 186867 | 188386 | 0.99194 |
| RACE NOT AVAILABLE | 41900 | 101 | 188386 | 0.00054 |
| ASIAN | 47940 | 1546 | 199126 | 0.00776 |
| BLACK OR AFRICAN AMERICAN | 47940 | 10348 | 199126 | 0.05197 |
| NATIVE HAWAIIAN/OTHER PACIFIC ISLAND | 47940 | 18 | 199126 | 0.00009 |
| HISPANIC WHITE | 47940 | 2763 | 199126 | 0.01388 |
| RACE NOT AVAILABLE | 47940 | 2162 | 199126 | 0.01086 |

*Fig. 10*

| VARIABLE | DESCRIPTION | THRESHOLDS |
|---|---|---|
| 1 | APPLICANT INCOME | 0, >100000, ELSE 1 |
| 2 | THE LEVEL OF DTI_MAX | 1, >0.3, ELSE 0 |
| 3 | THE LEVEL OF LTV_ACT | 1, >0.8, ELSE 0 |
| 4 | CREDIT BUREAU SCORE (FICO LEVEL) | <678, ELSE 0 |

Fig. 11

| HANDLE NUMBER | LOW INCOME | POOR CREDIT HISTORY | HIGH DEBT TO INCOME RATIO | HIGH LOAN TO VALUE RATIO | HIGH LOAN AMOUNT | RISK CATEGORY |
|---|---|---|---|---|---|---|
| 1 | 0 | 0 | 0 | 0 | 0 | 0 |
| 2 | 0 | 0 | 0 | 0 | 1 | 1 |
| 3 | 0 | 0 | 0 | 1 | 0 | 1 |
| 4 | 0 | 0 | 0 | 1 | 1 | 2 |
| 5 | 0 | 0 | 0 | 0 | 0 | 1 |
| 6 | 0 | 0 | 0 | 0 | 1 | 2 |
| 7 | 0 | 0 | 0 | 1 | 0 | 2 |
| 8 | 0 | 0 | 0 | 1 | 1 | 3 |
| 9 | 0 | 0 | 1 | 0 | 0 | 1 |
| 10 | 0 | 0 | 1 | 0 | 1 | 2 |
| 11 | 0 | 0 | 1 | 1 | 0 | 2 |
| 12 | 0 | 0 | 1 | 1 | 1 | 3 |
| 13 | 0 | 0 | 1 | 0 | 0 | 2 |
| 14 | 0 | 0 | 1 | 0 | 1 | 3 |
| 15 | 0 | 0 | 1 | 1 | 0 | 3 |
| 16 | 0 | 0 | 1 | 1 | 1 | 4 |
| 17 | 1 | 0 | 0 | 0 | 0 | 1 |
| 18 | 1 | 0 | 0 | 0 | 1 | 2 |
| 19 | 1 | 0 | 0 | 1 | 0 | 2 |

| MSA | DDI_AMERICAN_IND | DDI_ASIAN | DDI_BLACK_OR_ | DDI_NATIVE_HAWAII | DDI_HISPANIC_WHITE | DDI_2_OR_ORE_NO | DDI_JOINT |
|---|---|---|---|---|---|---|---|
| 22380 | 0.500 | 3.000 | 0.571 | 0.500 | 0.500 | 0.500 | 2.000 |
| 22520 | 0.500 | 0.500 | 6.286 | 3.667 | 5.500 | 0.500 | 11.000 |
| 22900 | 0.720 | 0.900 | 0.360 | 0.500 | 0.600 | 0.900 | 0.500 |
| 23420 | 1.133 | 0.486 | 1.316 | 1.214 | 1.417 | 1.700 | 0.567 |
| 23460 | 1.333 | 0.500 | 1.524 | 0.889 | 0.500 | 1.333 | 1.333 |
| 25260 | 0.500 | 4.500 | 0.900 | 2.250 | 1.500 | 0.500 | 4.500 |
| 26300 | 5.000 | 1.250 | 1.000 | 2.500 | 5.000 | 0.500 | 0.500 |
| 26620 | 2.355 | 1.442 | 1.442 | 1.121 | 2.242 | 0.500 | 2.102 |
| 27860 | 1.500 | 1.000 | 1.500 | 1.500 | 1.500 | 1.500 | 1.500 |
| 30780 | 1.375 | 0.489 | 0.786 | 1.222 | 0.524 | 1.833 | 2.444 |
| 31084 | 1.603 | 0.999 | 1.467 | 1.660 | 1.807 | 1.599 | 1.592 |
| 31460 | 1.500 | 1.000 | 1.500 | 1.000 | 1.500 | 1.000 | 1.000 |
| 32820 | 1.667 | 0.500 | 1.111 | 1.667 | 0.500 | 0.500 | 0.500 |
| 32900 | 2.125 | 1.214 | 1.417 | 4.250 | 4.250 | 1.417 | 1.417 |
| 33660 | 1.778 | 0.444 | 1.159 | 0.417 | 0.500 | 1.333 | 2.222 |
| 33860 | 0.500 | 0.227 | 0.833 | 0.714 | 0.313 | 0.500 | 0.500 |

MATCH TO FIG. 14B

| | | | MATCH TO FIG.14A | | | |
|---|---|---|---|---|---|---|---|
| 34900 | 2.75 | 0.500 | 0.688 | 2.750 | 0.500 | 2.750 | 0.500 |
| 36084 | 1.489 | 0.680 | 1.413 | 1.340 | 1.798 | 1.079 | 1.401 |
| 38060 | 1.089 | 1.250 | 1.509 | 1.327 | 0.794 | 0.956 | 1.477 |
| 38220 | 1.500 | 1.000 | 1.500 | 1.500 | 1.500 | 1.500 | 1.500 |
| 39140 | 0.833 | 1.250 | 0.625 | 0.500 | 1.250 | 2.500 | 0.500 |
| 40140 | 1.641 | 1.110 | 1.497 | 1.590 | 1.190 | 1.655 | 1.725 |
| 40900 | 0.995 | 0.470 | 1.385 | 1.019 | 1.126 | 0.804 | 0.728 |
| 41500 | 0.829 | 1.160 | 2.417 | 3.314 | 1.657 | 2.320 | 3.867 |
| 41740 | 1.667 | 0.333 | 0.714 | 1.852 | 2.500 | 0.500 | 1.111 |
| 41884 | 2.000 | 1.714 | 2.000 | 1.000 | 0.500 | 0.500 | 0.500 |
| 41940 | 1.000 | 1.500 | 1.500 | 1.000 | 1.000 | 1.000 | 1.000 |
| 42044 | 1.147 | 0.841 | 1.006 | 0.873 | 1.094 | 1.535 | 1.272 |
| 45500 | 0.500 | 0.500 | 0.500 | 5.000 | 0.500 | 0.500 | 0.500 |
| 46060 | 1.104 | 1.039 | 1.305 | 1.395 | 0.402 | 2.208 | 1.472 |
| 46220 | 2.400 | 1.200 | 1.500 | 0.600 | 2.000 | 0.500 | 1.500 |
| 49740 | 0.500 | 0.500 | 0.667 | 1.250 | 0.500 | 0.500 | 0.500 |
| 99999 | 2.001 | 1.435 | 1.532 | 1.844 | 1.329 | 1.530 | 1.501 |

*Fig. 14B*

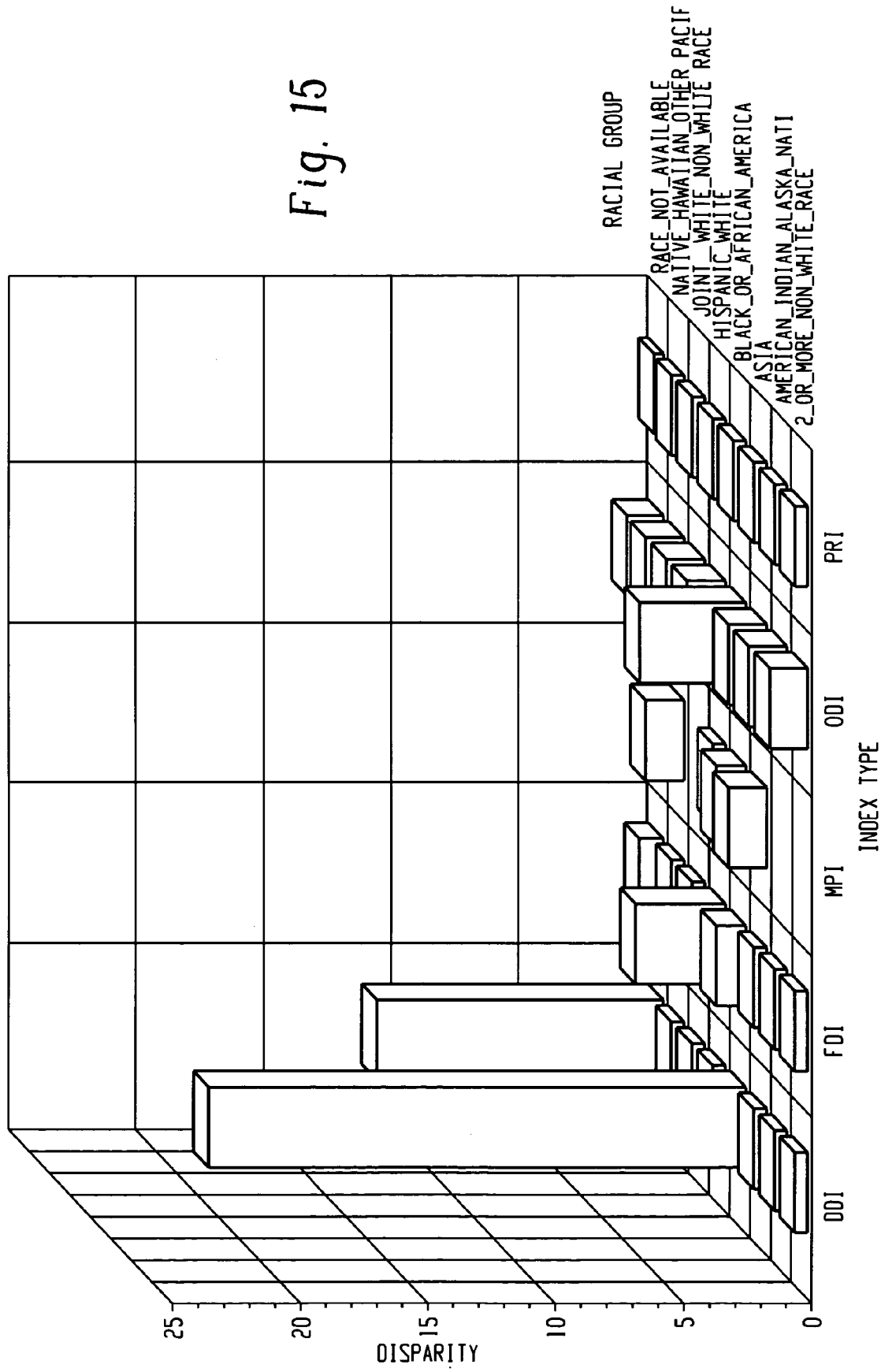

| MSA | RESULTS-BASED INDICATOR | DECISION-BASED INDICATOR | GLOBAL INDICATOR |
|---|---|---|---|
| 22520 | 4.41099 | 6.33957 | 7.72315 |
| 49740 | 5.56813 | 5.08094 | 7.53791 |
| 41884 | 0.81329 | 6.90008 | 6.94785 |
| 19460 | 2.01471 | 6.21225 | 6.53078 |
| 23460 | 0.54682 | 6.27115 | 6.29495 |
| 22900 | 1.03583 | 6.15257 | 6.23915 |
| 46220 | 1.27527 | 5.83243 | 5.97022 |
| 21820 | 0.99182 | 5.87503 | 5.95816 |
| 20940 | 3.00584 | 5.11501 | 5.93282 |
| 22380 | 1.38328 | 5.65074 | 5.81759 |

*Fig. 20*

| MSA | INCOME DISPARITY INDEX | DTI DISPARITY INDEX | LOAN AMOUNT DISPARITY INDEX | LTV DISPARITY INDEX | CREDIT DISPARITY INDEX | DECISION-BASED INDICATOR |
|---|---|---|---|---|---|---|
| 41884 | 1.000 | 1.375 | 0.942 | 6.571 | 1.022 | 6.90008 |
| 22520 | 3.393 | 1.313 | 0.706 | 1.789 | 2.004 | 6.33957 |
| 23460 | 1.188 | 1.188 | 1.141 | 0.901 | 2.161 | 6.27115 |
| 19460 | 1.270 | 1.188 | 1.464 | 0.889 | 0.940 | 6.21225 |
| 22900 | 2.191 | 1.375 | 0.804 | 1.456 | 2.375 | 6.15257 |
| 21820 | 1.313 | 1.188 | 0.931 | 0.800 | 1.131 | 5.87503 |
| 46220 | 0.800 | 1.313 | 1.225 | 1.722 | 0.719 | 5.83243 |
| 34900 | 0.609 | 1.125 | 1.324 | 1.348 | 0.909 | 5.74216 |
| 22380 | 0.875 | 1.250 | 0.698 | 2.071 | 0.811 | 5.65074 |
| 27860 | 0.844 | 1.250 | 1.021 | 0.969 | 1.359 | 5.49039 |
| 26300 | 1.063 | 1.125 | 0.617 | 1.938 | 1.156 | 5.45445 |
| 31460 | 0.729 | 1.125 | 0.653 | 1.250 | 1.490 | 5.33641 |
| 12220 | 1.188 | 1.250 | 1.146 | 1.042 | 1.313 | 5.17427 |
| 20940 | 0.844 | 1.313 | 0.740 | 1.292 | 0.988 | 5.11051 |
| 17980 | 1.063 | 1.125 | 0.938 | 0.750 | 1.313 | 5.09120 |
| 49740 | 0.922 | 1.250 | 0.638 | 1.646 | 1.055 | 5.08094 |

Fig. 22

COMPUTER-IMPLEMENTED LENDING ANALYSIS SYSTEMS AND METHODS

FIELD

The technology described in this patent document relates generally to the field of financial analysis software. More specifically, computer-implemented lending analysis systems and methods are described, which are particularly useful by mortgage lenders, government agencies or other parties to measure, monitor and/or manage fair lending disparity and potential risk exposure.

BACKGROUND

In recent years, federal enforcement agencies have expanded both the standards and scope of fair lending regulations. A major, recent change by The Board of Governors of the Federal Reserve System (FRB) required that mortgage lenders must disclose pricing data on higher cost loans as of March 2005 filing. In addition to expanding these fair lending reporting requirements, regulatory agencies have also extended the implementation and enforcement programs defined to curb predatory lending and racial redlining. For example, The Office of the Comptroller of the Currency issued anti-predatory lending guidelines effective Apr. 8, 2005 which defined certain loan terms, conditions and features as 'susceptible' to abusive, predatory, unfair or deceptive lending practices. Such programs aid regulatory agencies in their ongoing monitoring of the lending activities of national banks and their operating subsidiaries from multiple dimensions. Banks which fail to adequately comply with these requirements may be subject to substantial counterproductive consequences, including monetary penalties and even unrecoverable reputation damage.

SUMMARY

In accordance with the teachings described herein, computer-implemented lending analysis systems and methods are provided. As an example, a pre-processing module may be used to organize loan applicant data into a plurality of applicant groups based on one or more demographic factors, wherein a protected class is identified from the plurality of applicant groups. An index generation module may be used to calculate a plurality of disparity indices for the protected class by comparing lending-related data for the protected class with lending-related data for one or more control groups selected from the applicant groups. An indicator generation module may be used to calculate one or more singular indicators for the protected class by comparing the disparity indices with one or more reference indices. The indicator generation module may be further used to calculate a global indicator as a function of a plurality of singular indicators.

An example computer-implemented lending analysis method may include the following steps: organizing loan applicant data into a plurality of applicant groups based on one or more demographic factors, wherein a protected class is identified from the plurality of applicant groups; calculating a plurality of disparity indices for the protected class by comparing lending-related data for the protected class with lending-related data for one or more control groups selected from the applicant groups; and calculating one or more singular indicators for the protected class by comparing the disparity indices with one or more reference indices.

BRIEF DESCRIPTION OF THE DRAWINGS

FIG. 6 shows a partial example of other loan applicant data.

FIG. 7 illustrates an example of a chi-square test that may be used for record selection purposes.

FIGS. 8 and 9 depict example protected classes and control groups.

FIG. 10 illustrates an example of an applicant group that has insufficient data for evaluation.

FIG. 11 depicts example thresholds for defining a handle.

FIG. 12 shows example handles that are based on borrowers' attributes.

FIG. 14 depicts an example of a calculated index table.

FIG. 15 depicts a graphical representation of example calculated indices.

FIG. 20 depicts an example table that may be generated by the visualization module to identify the singular indicators and global indicator calculated for a plurality of groupings.

FIG. 22 depicts an example table that may be generated by the visualization module to identify the disparity indices contributing to singular indicators.

DETAILED DESCRIPTION

Figure 1:
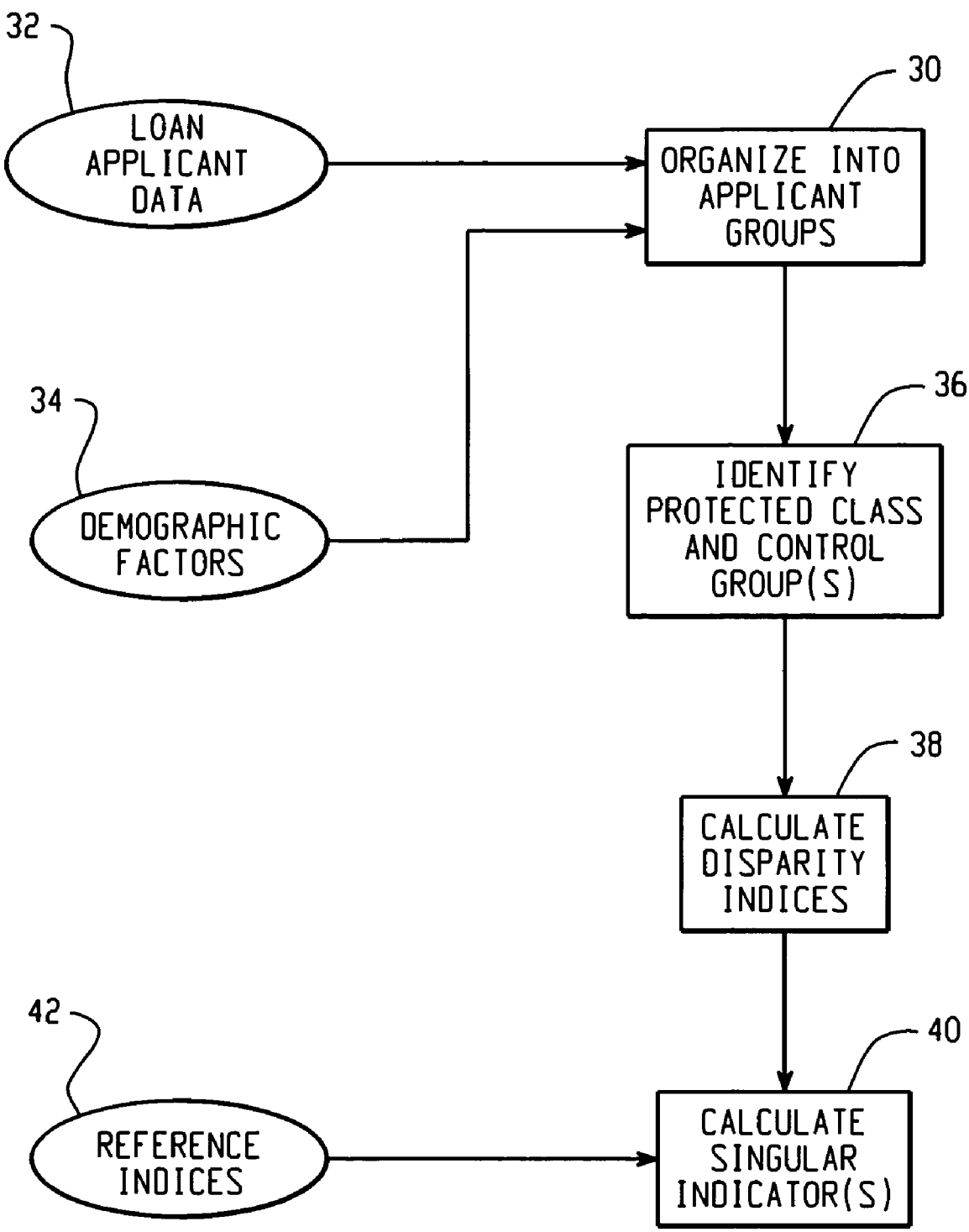
FIG. 1 is a block diagram depicting an example computer-implemented lending analysis method.

FIG. 1 (Single Indicator Case) is a block diagram depicting an example computer-implemented lending analysis method. At step 30, loan applicant data 32 is organized into a plurality of applicant groups based on one or more demographic factors 34. In step 36, a protected class and one or more control groups are identified from the plurality of applicant groups. Examples of a protected class may include all non-white loan applicants, female loan applicants, loan applicants over 62 years old, applicants having an income level below a predetermined threshold, or others. Examples of a control group may include, white loan applicants, male loan applicants, loan applicants under the age of 62 years, loan applicants having an income level over a predetermined threshold, or others.

In step 38, a plurality of disparity indices are calculated by comparing lending-related data for the protected class with lending-related data for one or more control groups selected from the applicant groups. The disparity indices may include results-based indices, decision-based indices, and/or other types of disparity indices.

In step 40, one or more singular indicators are calculated by comparing the disparity indices with reference indices 42. The reference indices may, for example, be generated using pre-defined criteria or may be calculated, for example using peer or industry composite data. The reference indices are used, among other purposes, to represent "risk free" reference points to which the disparity indices may be compared. A "risk free" reference point is neutral, corresponding to all disparity indices being at parity with a value of 1.0. Other useful reference points can have one or more "risk free" components corresponding to one or more disparity indices being at parity with a value of 1.0, while allowing the remaining disparity indices to alternate in a pre-determined value, or range of values. Other references can include points that correspond to cases which are advantageous (e.g. all disparity indices with value 0.5) or disadvantageous to protected classes (e.g. all disparity indices with value 2.0). The singular indicator(s) may be calculated using distance analysis or other techniques to compare the disparity indices with the reference indices.

It should be understood that similar to the other processing flows described herein, one or more of the steps and the order in the diagram may be altered, deleted, modified and/or augmented and still achieve the desired outcome.

Figure 2:
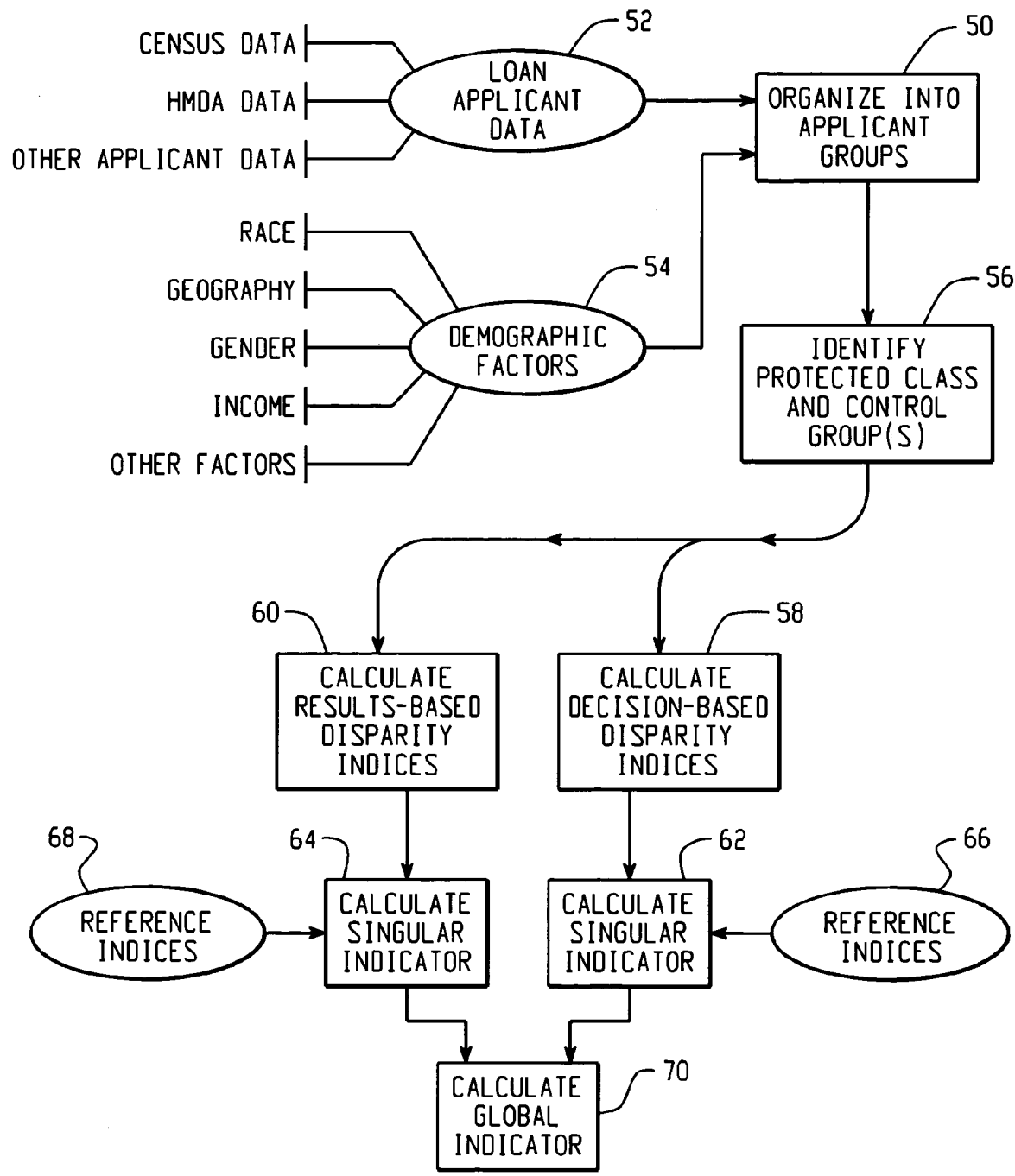
FIG. 2 is a block diagram depicting another example computer-implemented lending analysis method.

For example, FIG. 2 (Dual Indicator Case) depicts another example computer-implemented lending analysis method in which a global indicator is generated from a plurality of singular indicators. At step 50, loan applicant data 52 is organized into a plurality of applicant groups based on one or more demographic factors 54. Then, in step 56, a protected class and one or more control groups are identified from the plurality of applicant groups. The loan applicant data 52 may, for example, include census data, Home Mortgage Disclosure Act (HMDA) data, credit data, and/or other data available for loan applicants. The demographic factors 54 may, for example, include race, geographic location, gender, income level, color, ethnicity, religion, national origin, marital status, handicap, disability, familial status, age, receipt of public assistance income, and/or other factors.

In steps 58 and 60 decision-based disparity indices and results-based indices are calculated by comparing lending-related data for the protected class with lending-related data for one or more control groups selected from the applicant groups. Some specific examples of decision-based indices and results-based indices are described below with reference to FIG. 13. In step 62 a decision-based singular indicator is calculated by comparing the decision-based disparity indices with reference indices 66. In step 64 a results-based singular indicator is calculated by comparing the results-based disparity indices with reference indices 68. It should be understood that other types of disparity indices and singular indicators may be used in addition to or instead of decision-based and results-based (e.g. channel-based, market-based, collateral-based, transaction-based, product-based, program-based, etc.).

In step 70, a global indicator is calculated as a function of the singular indicators 62, 64. The global indicator may be calculated from the singular indicators using a distance measurement technique (e.g., a Euclidean distance formula), using a weighted average of the singular indicators, or by some other appropriate means.

Figure 3:
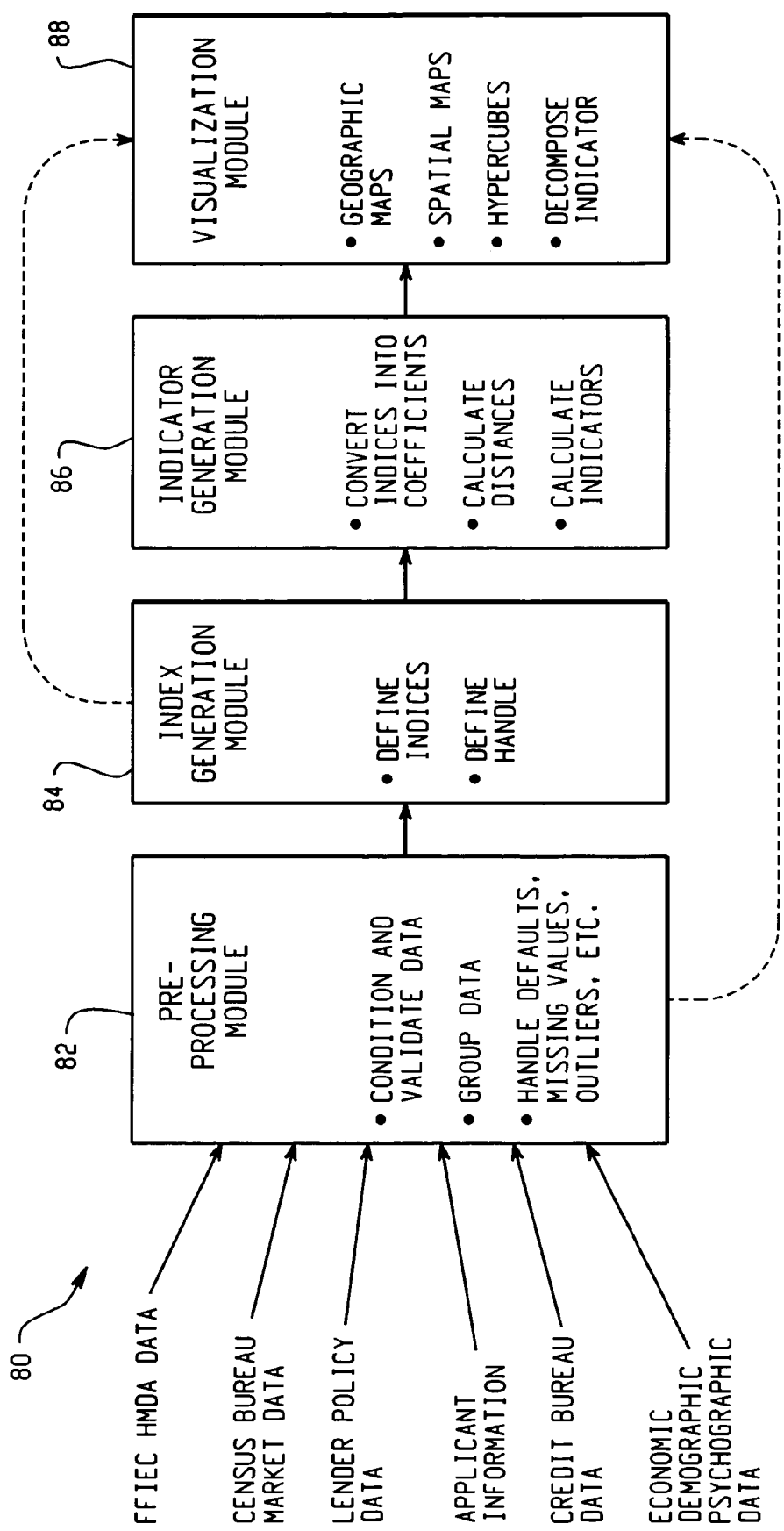
FIG. 3 is a block diagram depicting an example computer-implemented lending analysis system.

FIG. 3 (General Case: Global Indicator) is a block diagram depicting an example computer-implemented lending analysis system 80. The system 80 includes a pre-processing module 82, an index generation module 84, an indicator generation module 86, and a visualization module 88. In operation, the system 80 processes applicant data to generate one or more singular indicators that may, for example, be used to monitor fair lending risk exposure or compliance for a protected class. In some examples, two or more singular indicators may also be combined to generate a global indicator.

The diagram provides examples of different types of applicant data which may be input to the system, including HMDA data, census data, lender policy data, applicant information recorded by a lending institution, credit bureau data, and/or other economic, demographic, or psychographic data relating to loan applicants. In one example, the applicant data may include at least census data and some type of credit history data (e.g., loan performance data, credit bureau data, etc.), however other types of data could also be used.

The pre-processing module 82 organizes the applicant data into groups based on demographic factors, such as race, geographic location, gender, income level, color, ethnicity, religion, national origin, marital status, handicap, disability familial status, age receipt of public assistance income, and/or other factors. The pre-processing module 82 may also be used to define which of the applicant groups fall within one or more protected classes, and which are in one or more control groups. Other pre-processing functions may, for example, include assigning optimal default settings for missing data values or insufficient data, assigning handles to complex data groups (see example below), validating applicant data, and/or other functions.

The index generation module 84 generates disparity indices for comparing lending-related data of the protected class with lending-related data for the control group(s). The disparity indices measure lending disparities between the protected class and the control group(s). The disparities between the protected class and control group may, for example, be defined dynamically through different thresholds determined by loan property, products, market, channel, etc. This can provide for efficient and accurate evaluation of different risk scenarios. The disparity indices may be defined such that higher values indicate unfavorable ratios for the protected class group in terms of risk, market, channel, collateral, transaction, product, or program effects relative to the control group.

The indicator generation module 86 generates one or more singular indicators from the disparity indices and compares the disparity indices with their corresponding reference indices. Singular indicators may, for example, be generated from both lending results and attributes to reveal possible inconsistencies in the lending process in order to assist in identifying potential lending risk or fair lending noncompliance. The indicator generation module 86 may also generate a global indicator based on two or more singular indicators.

To calculate a singular indicator, the indicator generation module may convert the disparity and reference indices into coefficient values, and compare the coefficient values using distance formulas. For example, multivariate analysis methods may be used to represent multiple indices with a small number of uncorrelated principal components, allowing for an increased separation of class distance and computation efficiency. The distance formula(s) used to calculate the singular indicators may, for example, be selected to address different business needs, such as costs, error rate, data quality issues, or others.

The visualization module 88 provides data output for the user. Data output may, for example, include spatial plots, geographic maps, hypercubes, or other data types. In addition, the visualization module 88 may be used to decompose a singular indicator or global indicator into one or more of its component parts. As illustrated by the dotted lines in FIG. 3, data from each of the other software modules 82, 84 and 86 may be included in the data output generated by the visualization module 88.

It should be understood that the functions performed by the software modules and/or sub-modules described herein may, in other examples, be performed instead by one or more computer programs that are not organized into software modules or that are differently organized into software modules.

Figure 4:
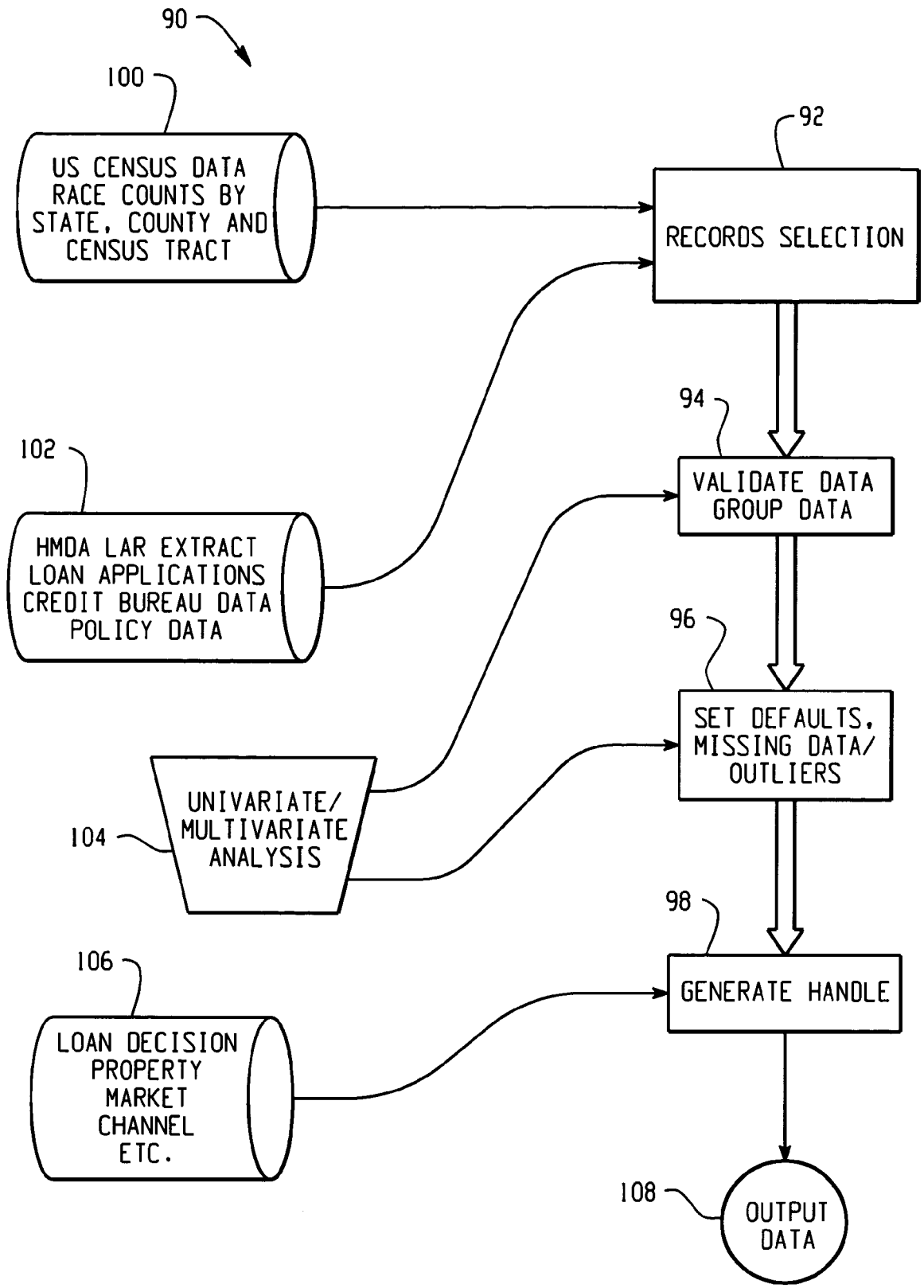
FIG. 4 is a functional diagram of an example pre-processing module.

FIG. 4 is a functional diagram of an example pre-processing module 90. The pre-processing module includes a records selection sub-module 92, data validation and data grouping sub-module 94, a default setting sub-module 96 and a handle generation sub-module 98.

The records selection sub-module 92 is used to merge the applicant data 100, 102 and select specific records from the data to evaluate. The applicant data may, for example, include census data 100 and some type of credit history data 102 (e.g., HMDA data, loan performance data, credit bureau data, etc.), which is merged by the records selection sub-module 92 into records that include both the demographic and loan-related data for the loan applicants.

Figure 5:
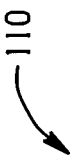
FIG. 5 shows a partial example of census data.

FIGS. 5 and 6 show examples of applicant data. FIG. 5 shows a partial example of census data 110 for a particular metropolitan statistical area (MSA). FIG. 6 shows a partial example of other loan applicant data 112. The loan applicant data 112 illustrated in FIG. 6 may, for example, be merged from HMDA data, application data, credit data, and/or from other data sources.

With reference again to FIG. 4, after the data is merged, the records selection sub-module 92 may be used to select particular records for evaluation. For example, specific loan applications may be selected for evaluation based on criteria such as loan purpose, loan type, lien status, owner occupancy, property type, MSA, state, and/or other factors. In addition, records may be selected in order to evaluate specific areas of interest, such as loan underwriting, loan pricing, loan marketing, product, program or channel steering, redlining, refinancing, or others. Records selection may, for example, be performed by a software user or may be performed automatically by the records selection sub-module 92 based on some predefined criteria. In many cases record selection will be based on some previous data analysis.

FIG. 7 illustrates an example of a chi-square test 113 that may be used for record selection purposes. In this example, prior tests show that there is a significant disparity between minority groups and non-minority groups across different MSAs regarding loan underwriting decisions.

With reference again to FIG. 4, the data validation and data grouping sub-module 94 is used to group applicant records using one or more demographic and/or loan-related factors. Applicant records are grouped into one or more protected classes and one or more control groups based on demographic factors, such as race, geographic location, gender, income level, color, ethnicity, religion, national origin, marital status, handicap, disability familial status, age receipt of public assistance income, and/or other factors. In addition, applicant records may, for example, be grouped based on geographical information, such as MSA (metropolitan statistical area), state, channel, etc., or may be grouped based on other factors, such as loan type, property type, or others.

Examples of some possible protected classes and control groups are illustrated in FIGS. 8 and 9. FIG. 8 is a chart 114 depicting example protected classes and control groups for individual borrowers. FIG. 9 is a chart 115 depicting how the example protected classes and control groups may vary for joint borrowers. With reference first to FIG. 8, the chart includes a first column that identifies applicant groups for race and ethnicity, gender and age, and two columns that identifies whether the particular applicant group has been classified as a protected class or a control group. In this example, a protected class for race includes all non-white loan applicants, a protected class for gender includes all female loan applicants, and a protected class for age includes all loan applicants that are 62 years old or greater. The control group for race is white, non-Hispanic loan applicants, the control group for gender is male, and the control group for age is loan applicants under 62. In the example of FIG. 9 showing protected classes for joint borrowers, the protected classes include all joint borrowers that are both non-white, all joint borrowers that are both female, and joint borrowers where the primary borrower is 62 years old or greater.

With reference again to FIG. 4, the sub-module 94 may also validate the records by determining if one or more data fields are missing from the record. Records having an absence of information in one or more required fields, or where there are values that fall into a range that is outside an expected normal range may be segregated and flagged for further review, possible correction, and analysis. Records having missing or suspect values that are identified by sub-module 94 may be further processed by the default setting sub-module 96.

FIG. 10 illustrates an example 116 of an applicant group that has insufficient data for evaluation. In this example, MSA 41900 has no population for the group "Native Hawaiian/other Pacific Islander." This zero population value may be replaced with a default value in order to calculate the market penetration index. The value of the default may depend on the nature of the index to be calculated.

With reference to FIG. 4, the default setting sub-module 96 may be used to assign data values that are unknown or missing in a record. If the system simply discarded or otherwise ignored missing data or suspect data in a record, then valuable information could be lost. If the number of missing values for a particular attribute (e.g., variable in a record) is within a specific tolerance level, then the missing value(s) can be imputed. Different methods may be used to impute missing values, depending on the nature of the data. For example, missing data may be replaced with the mean or mode of its nearest neighbor, or some user specified value(s).

In one example, the data values 0.5, 1.0 and 1.5 could be assigned as default values, depending upon whether the default value is to be favorable or unfavorable to the protected class. In this example, 1.0 could be used as a neutral default value, 0.5 could be used as a default value that is favorable to the protected class, and 1.5 could be used as a default value that is unfavorable to the protected class.

As illustrated, a univariate or multivariate analysis 104 may also be used to assign default values to a record. Data sufficiency is influenced by the required p-value, or the value of α (the risk of rejecting a true hypothesis), value of P (the risk of accepting a false null hypothesis when a particular value of the alternative hypothesis is true), and value of the population standard deviation. In one example, specific default values may be assigned to missing index values for a particular observation to reflect the nature of the data and potential disparity. A specific default value less than 1 is assigned to an index which is favorable to the protected group, and a specific default value greater than 1 is assigned to an index which is unfavorable to the protected group. For example, by default, one of the following data values may be assigned, depending on the specific situation:

1. If data is missing for both the protected and control groups, then the value 1.0 may be used as the default value.

The value 1.0 represents a neutral point or the fact that neither the protected group nor control group is favored.

2. If data is missing for the protected class, but data is present for the control group, then the default value may be selected according to the nature of the disparity, and may be either favorable or unfavorable to the protected class. For example, in the case of an origination disparity index (ODI), if origination data is missing for the protected class, then the index may be assigned a value greater than one. In the case of a denial disparity index (DDI), if origination data is missing for the protected class, then the index may be assigned a value less than one.

3. If data is missing for the control group, but not for the protected class, then the default value may be either favorable or unfavorable to the protected class, depending on the nature of the disparity. For example, in the case of an origination disparity index (ODI), if there is not origination data for the control group, then the index may be assigned a value less than one. In the case of a denial disparity index (DDI), if there is no origination data for the control group, then the index may be assigned a value greater than one.

The handle generation sub-module 98 may then be used to further categorize the applicant data using handles based on an association of factors 106. A handle may, for example, provide an efficient way to categorize the default risk of an applicant, with certain handle values representing a higher default risk than others. The frequency distribution of a particular group of applicants with certain handle values indicates the overall risk of that group. This concept may be used to define and validate a combined disparity index. In this manner, a particular handle can be used to craft an effective and efficient way to view results from different perspectives. In order to create a handle, thresholds may be chosen based on policy data combined with data distribution, as illustrated by the example shown in FIG. 11.

Following are three examples of handles that may be generated by sub-module 98.

1. Example Borrower Risk Handle—One example handle grouping may be based upon debt-to-income ratio range (DTI), loan-to-value ratio range (LTV), credit bureau score range, and credit history summary. Assume the ranges of DTI and LTV are High/Low for this example, while the groupings for credit bureau score range are low (less than 660), medium (661-720), and high (721+). Assume the categories for credit history are poor, fair and good. Then, a handle may be generate representing the cross product of those factors for a total of thirty six (2×2×3×3) unique combinations.

2. Example Transaction Handle—Another example handle grouping may be based upon pricing option, term to maturity, loan amount tier, and down payment. Assume the pricing options are fixed, variable, interest only; term to maturity is 10 years or less, 11-20 years, or 21+ years; loan amount tier is under $175M, $176-300M, $301M+; and down payment is none to 5%, 6-19%, or 20%+. In this case, a handle may be generated representing the cross product of those factors for a total of eighty one (3×3×3×3) unique combinations.

3. Example Property Handle—Another example handle grouping may be based on age, type of structure, location, appraisal method, flood zone, high rise, and dwelling type. Assume the age is new versus existing; the type of structure is frame, stucco, brick; the location is rural, suburban, inner city; the appraisal is tax value, model, drive-by, certified; the flood zone is yes or no; high rise is 1-4 stories, 5+ stories; and dwelling type is 1-4 family unit, condo, townhouse. In this case a handle would may be generated that represents the cross product of those factors for a total of six hundred and forty eight (2×3×3×3×2×2×3) unique combinations.

Some additional example handles are shown in FIG. 12. FIG. 12 shows example handles 118 (handle numbers 1-19) that are based on borrowers' attributes. For instance, handle number 1 represents borrowers that do not have any of a low income, a poor credit history, a high debt to income ratio, a high loan to value ratio, or a high loan amount; handle number 2 represents borrowers that have a high loan amount; and so on. Also illustrated are example risk categories associated with each handle, with high-valued risk categories representing a greater risk.

With reference again to FIG. 4, the output 108 from the data pre-processing module 90 may include grouped, validated, and summarized information for each type of disparity. This data 108 may be input to the index generation module 84 to calculate disparity indices for the data.

Figure 13:
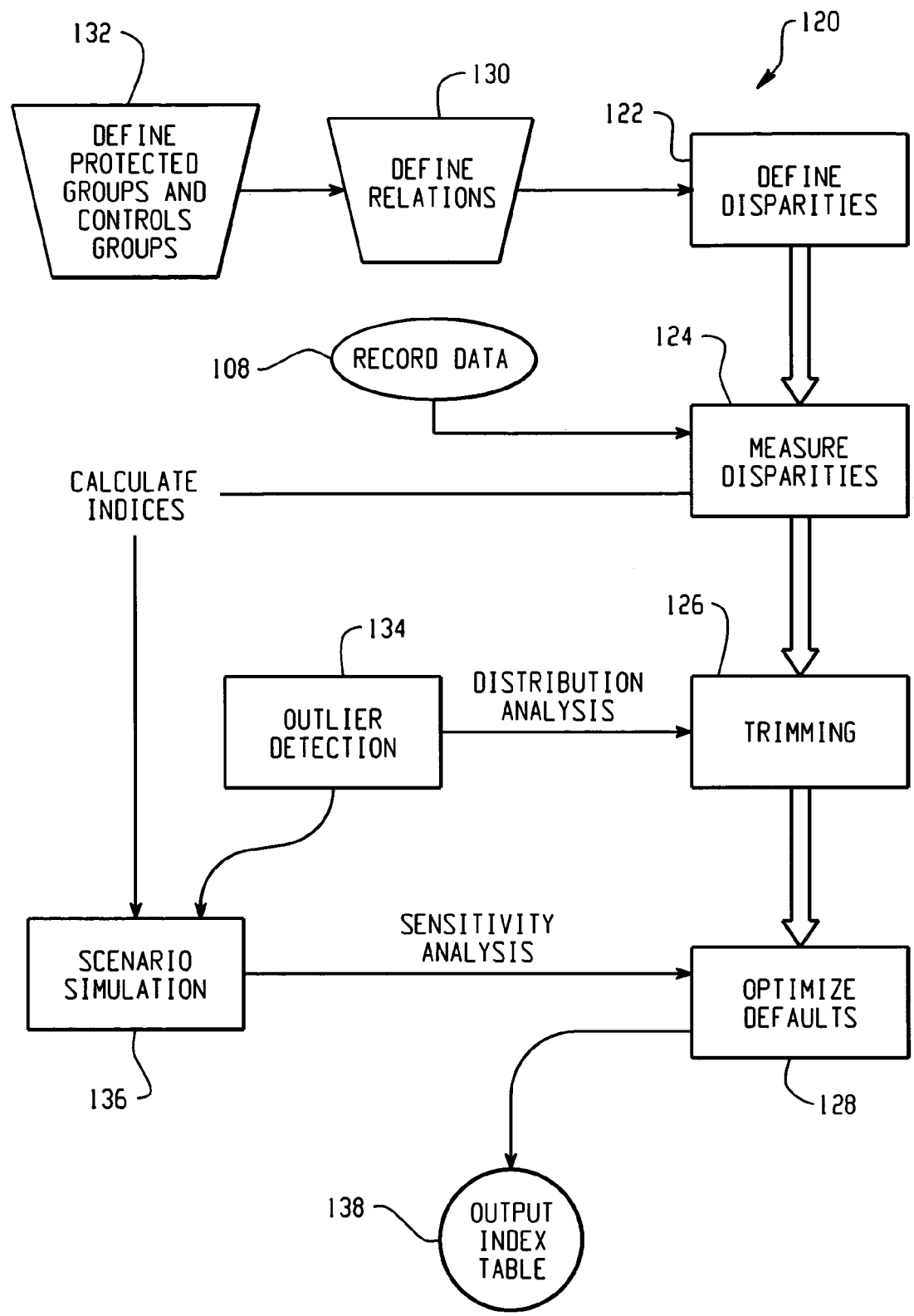
FIG. 13 is a functional diagram of an example index generation module.

FIG. 13 is a functional diagram of an example index generation module 120. The index generation module 120 includes a disparity defining sub-module 122, a disparity measuring sub-module 124, a trimming sub-module 126 and a default optimization sub-module 128.

The disparity defining sub-module 122 is used to define lending disparity for one or more of the protected classes with respect to a set of disparity indices. The sub-module 122 defines the disparity indices to be considered by the system, including the relationships 130 between the protected classes and control group(s) 132 represented by each disparity index. The disparity indices may be results-based indices, decision-based indices, and/or other types of disparity indices. Some examples of results-based and decision-based indices are set forth below, however other indices could also be used.

Examples of Results-Based Indices

1. Origination Disparity Index (ODI)—ODI is the rate of origination of the control group relative to the origination rate for a protected class. For this index, and with the other indices, large values indicate a certain level of disparity and thus potential discrimination relative to the control group. Therefore, the control group origination rate enters the numerator in the ODI index. When the control group has a relatively high origination rate, and the protected class has a relatively low origination rate, the ODI will show some level of disparity.

2. Denial Disparity Index (DDI)—DDI is the rate of denials of a protected class relative to the rate of denials for the control group. The minority denial rate enters the numerator in the DDI. When the control group has a relatively low denial rate, and the protected class has a relatively high denial rate, the DDI will show some relative level of discrimination.

3. Fallout Disparity Index (FDI)—FDI is the rate of fallout of a protected class relative to the fallout rate of the control group. The protected class rate enters the numerator in the FDI. When the control group has a relatively low fallout rate, and the minority group has a relatively high fallout rate, the FDI will show some relative level of discrimination.

4. Market Penetration Index (MPI)—MDI is the population size of a protected class relative to their application rate within a particular geographically defined area (e.g., census tract, MSA, assessment area, etc). This index captures the degree to which various lines of business are penetrating the applicant pool of the protected class.

5. Product Disparity Index (PDI)—PDI is the rate of a high-priced loan product (i.e. loans with a spread >3%) of a protected class relative to the high-priced loan product of the control group.

6. Sub-Prime Product Application Mix Disparity Index (SPAMDI)—SPAMDI is the proportion of sub-prime loan applications for a protected class relative to their total applications, divided by the same ratio associated with control group applicants. This index captures the degree to which sub-prime products are marketed to the protected class relative to their control group.

7. Sub-Prime Product Origination Mix Disparity Index (SPOMDI)—SPOMDI is the proportion of sub-prime loans for a protected class relative to their total originations, divided by the same ratio associated with control group borrowers. This index captures the degree to which sub-prime products are sold to the protected class relative to the control group.

8. Market Share Index (MSI)—MSI is the percentage of the market share for total applications divided by the percentage of the market share of applications in the protected class. This index captures the degree to which the protected class applicants are represented relative to the total applicants in a particular market.

Examples of Decision-Based Indices

1. Debt-to-Income Disparity Index (DTIDI)—DTDI is the proportion of control group applicants with high DTI (e.g., >0.4) relative to the proportion of applicants in the protected class with high DTI.

2. Loan-to-Value Disparity index (LTVDI)—LTVDI is the proportion of control group applicants with high LTV (e.g., >80) relative to the proportion of applicants in the protected class with high LTV measures.

3. Bureau Score Disparity index (FDI)—FDI is the ratio of control group low FICO bureau score (e.g., <680) applicants relative to low FICO score protected class applicants.

4. Income Disparity Index (IDI)—IDI is the proportion of control group low income (e.g., <$25,000) applicants to protected class low income applicants. A value greater than 1 indicates that overall, control group applicants have lower incomes than that of the protected class.

The disparity measurement sub-module 124 calculates the disparity indices using the definitions from sub-module 122 and the record data 108 from the data pre-processing module 82. To ensure accuracy, indices may be recalculated each time at various aggregate levels. However, if there is sufficient data at the lowest level, then the calculated indices may also be aggregated to a higher level to achieve better performance.

The trimming sub-module 126 analyzes the calculated indices to replace outliers 134 with default values. For example, indices with extreme values (outliers) may be analyzed with distribution plots to determine if alternative default values should be used. In one example, trimming may be applied to extreme values or outliers identified based on distribution of the disparity indices. For instance, indices with extreme values may be analyzed with distribution plots to determine if alternate values should be used.

In another example, trimming may be applied to values that are above a pre-determined policy threshold. For instance values above a threshold may be trimmed if the values would otherwise result in a misinterpretation of the index.

In another example, trimming may be applied if insufficient data may result in misleading indices. For instance, in a minority-dominated geography, loan origination disparity may be significantly inflated. In this case, trimming may be used to reduce the value of the inflated index to curb any undue influence on the indicator calculation.

The default optimization sub-module 128 is used to optimize default values that have been used for missing data, outliers and/or insufficient data. These default values can have an important impact on disparity indices. In order to select optimum thresholds that minimize error and better represent the data, scenario simulations 136 and sensitivity analysis may be used to evaluate the effects of changes in defaults. Classes that are less sensitive to changes in the defaults may be separated from those that are more sensitive.

If defaults are used to calculate the disparity index when data is not available or is insufficient, then the assigned default values may impact the results of the results of the disparity index or indicator calculation, and in some cases this impact may be significant. In many cases, default values may be assigned to represent the worst possible scenarios. Special default values may be assigned to reflect the severity of data issued, to reflect disparity testing power (e.g., false negative vs. false positive), or to reflect other business needs. When various scenarios are possible, optimal defaults may be chosen using an optimization process.

For example, a scenario table may be created for all combinations of default values within a proscribed range. An example optimization process may then iterate through the different scenarios using the combinations in the scenario table. The optimal scenario may then be selected using one or more selection criteria. Example selection criteria may include: the percent of index variation explained by the specified number of principal components (e.g., selecting the highest variation explained by the least number of principal components); the sensitivity of class ranking to defaults (e.g., selecting based on the minimum change in default values for class ranking that generate more stable ranking); the error rate (e.g., minimizing the costs of false positive or false negative error); and/or specific business needs (e.g., to identify the areas with the greatest loan origination disparity.) In this manner, defaults may be selected that produce principal components which capture a certain amount of index variation in the least number of principal components.

The output 138 from the index generation module 120 may include a calculated index table that provides the values of the disparity indices for use by the indicator generation module 86. A partial example of a calculated index table is shown in FIG. 14. A graphical representation of example calculated indices is illustrated in FIG. 15. The graph shown in FIG. 15, representing example output indices from the index generation module 120, may for example be displayed by the visualization module 88 (as illustrated by the dotted line connecting the index generation module 84 and visualization module 88 in FIG. 3).

Figure 16:
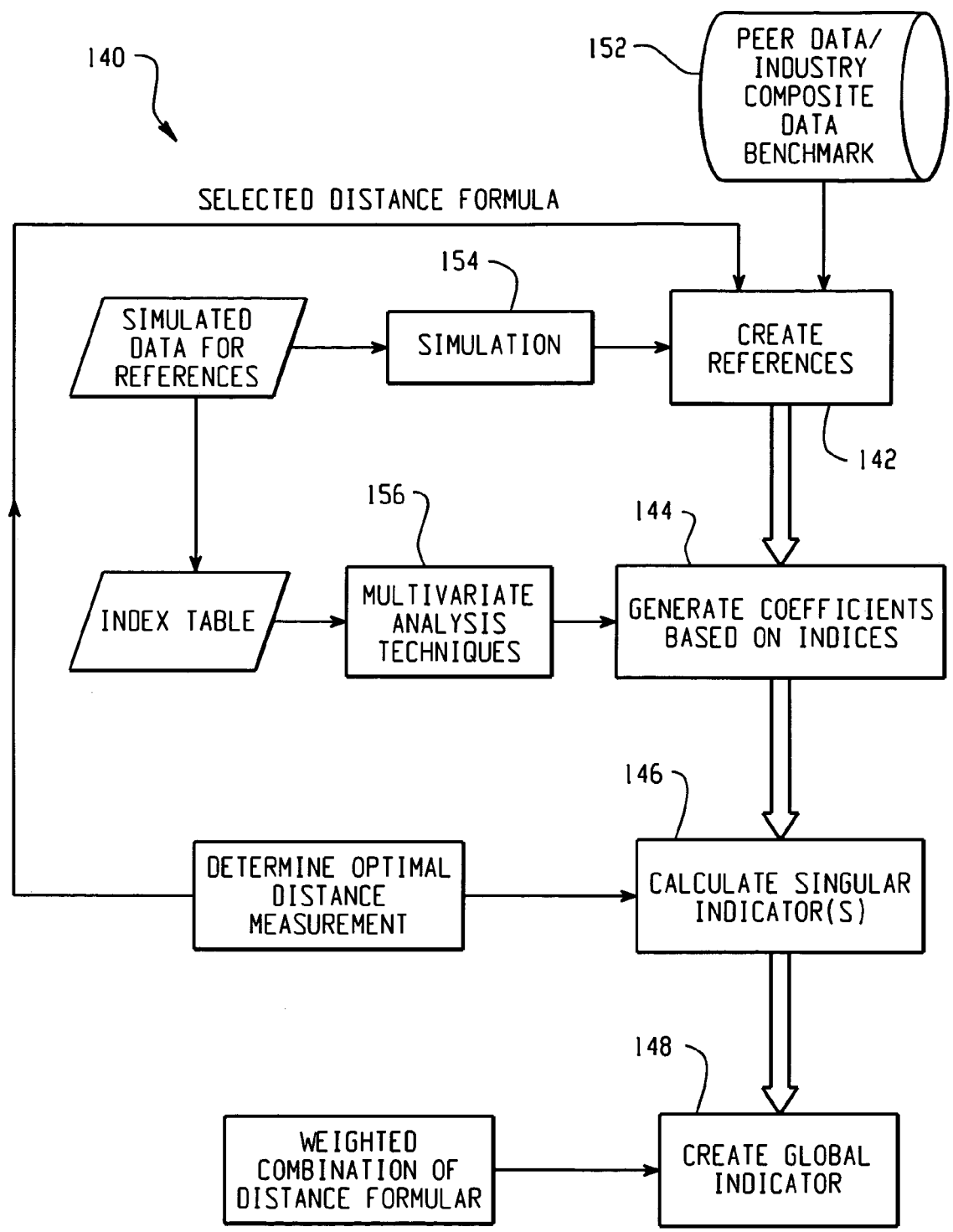
FIG. 16 is a functional diagram of an example indicator generation module.

FIG. 16 is a functional diagram of an example indicator generation module 140. The indicator generation module 140 includes a reference creation sub-module 142, a coefficient generation sub-module 144, a singular indicator sub-module 146, and a global indicator sub-module 148. In operation, the indicator generation module 140 uses a distance analysis to determine a singular indicator(s) and possibly a global indicator by comparing the disparity indices with reference indices. A singular indicator is a single risk indicator calculated from a plurality of disparity indices. A global indicator is a single risk indicator calculated from a plurality of singular indicators.

The reference creation sub-module 142 is used to calculate reference indices to compare with each of the disparity indices. Reference indices may, for example, be generated using pre-defined criteria or based on peer or industry composite data 152. The reference indices are used, among other purposes, to represent "risk free" reference points to which the disparity indices may be compared. A "risk free" reference point is neutral, corresponding to all disparity indices being at parity with a value of 1.0.

In order to calculate reference indices using pre-defined criteria, appropriate variables may be created to display desired cases. For example, desired cases may include all disparity indices at parity, all except one disparity indices at parity, all possible combinations for a predicted value (e.g., 1.5 or 2), or others. References may also be calculated to calibrate and view singular indicators from different aspects of a business. If there is a disparity in any of the dimensions, this singular risk indicator captures it. In addition, to better reveal outliers, a spatial surface approach may be used by creating a surface with values of all possible combinations of specified indices from simulation 154. Measurement units that are outside of the surface may be identified as outliers and subject to further analysis to determine their contributing factors.

If peer or industry composite data 152 is used, then the reference indices may be calculated by inputting this reference data 152 into the disparity equations defined by the index generation module 84.

The coefficient generation sub-module 144 is used to calculate a set of linear coefficients from the disparity indices and the reference indices using a multi-variate analysis technique 156, such as principal components analysis (PCA). Principal component analysis is a decomposition technique that produces a set of expression patterns known as principal components (PCs). Principal components are uncorrelated linear combinations of the original input variables (such as disparity indices) and can be computed as:

$$Y = X * W$$

Where Y is the n-by-p matrix of principal components; X is the n-by-p matrix of centered data; and W is the p-by-p matrix of weights, obtained from an eigenvector-eigenvalue decomposition of the covariance matrix of the data.

There are p principal components, and each is a linear combination of the observed variables. The principal components are all mutually orthogonal. The first principal component is the linear combination of the observed variables with maximum variance. The second principal component is the linear combination of the observed variables, out of all linear combinations orthogonal to the first, with maximum variance, and so on. Given the decreasing variance property, much of the variance (information) in the original set of p variables tends to concentrate in the first few principal components. Therefore variance for the p variables concealed in the original data set can reveal itself on the first few principal components, because principal components can provide maximum separation between the classes or groups with substantial indices. This feature enables the detection of observations with extreme values (outliers) in a space defined by 1, 2, or 3 principal components.

Figure 17:
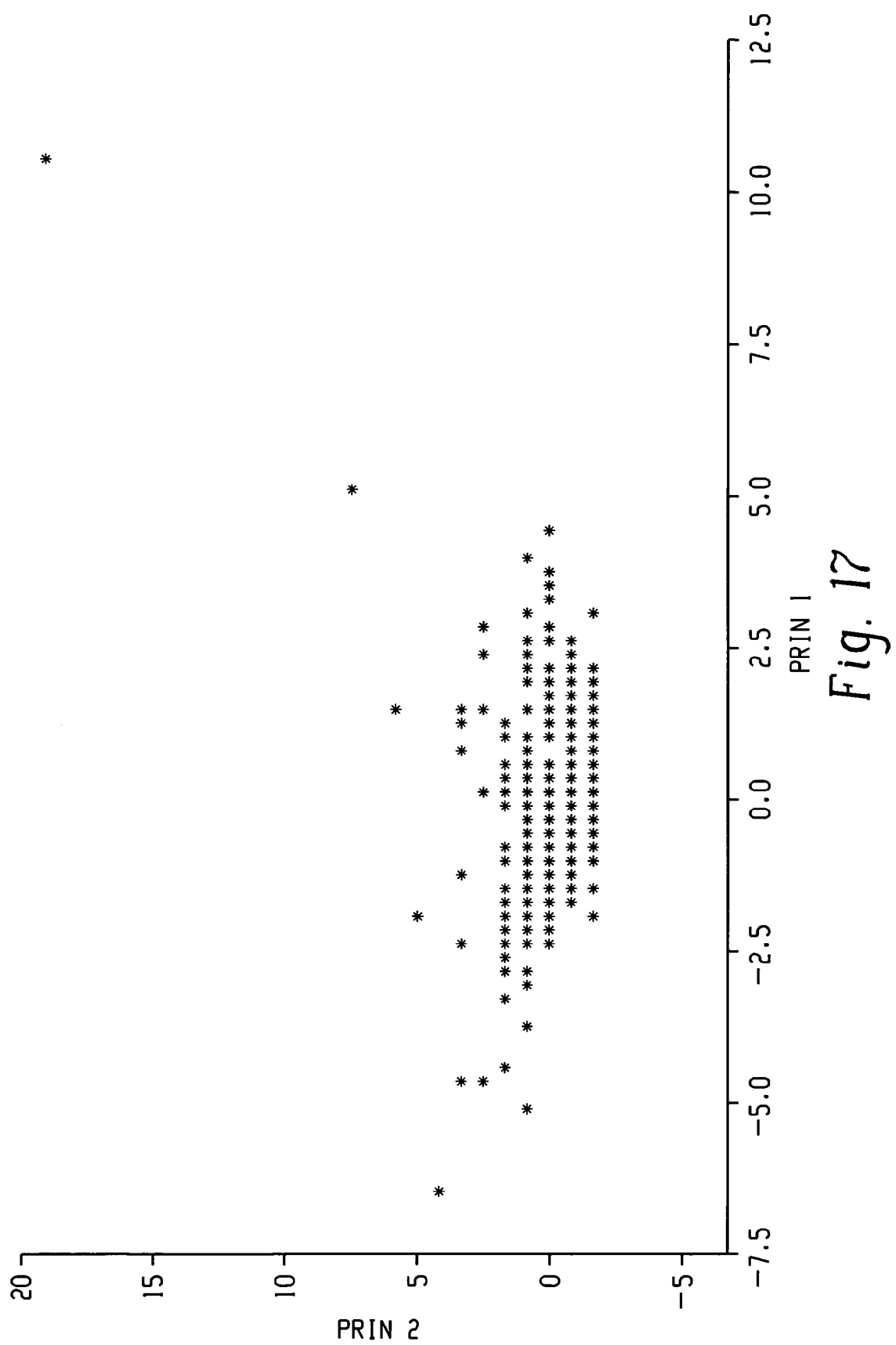
FIG. 17 depicts a scatter plot that may be used to display the first and second principal components of calculated indicators.

After performing principal components analysis, a scatter plot may be used to display the first and second principal components (representing the largest fraction of the overall variability) on the vertical and horizontal axis respectively. An example scatter plot is illustrated in FIG. 17. This type of view is useful for selecting and making lists of indices which exhibit high levels for one or two principle components. In the example shown in FIG. 17, indices that exhibit high levels of the first principal component and low levels of the second principal component, if any, would be displayed in the lower right corner of the plot.

With reference again to FIG. 16, the singular indicator sub-module 146 uses distance measurement techniques to calculate one or more singular indicators from the disparity and reference coefficients. If there is only one set of disparity indices in consideration, then the indicator generation module 140 may output one singular indicator. However, if there are multiple sets of disparity indices, then a corresponding number of singular indicators may be calculated. For example, singular indicators may be calculated for each type of disparity index (e.g., results-based and decision-based indices) at a plurality of locations (e.g., MSAs) or other groupings. In this manner, risk exposures may be isolated in specific areas at varying levels of granularity by deriving singular indicators at differing levels, for example by geography, organizational unit, institutional legal entity, handle grouping, etc.

Distance measurements used to calculate a singular indicator could include Euclidean Distance, Manhattan Distance, Great Circle Distance, Mahalanobis Distance, or others. Of these, the Mahalanobis distance has the advantage of utilizing group means and variances for each variable, as well as the correlations and covariance between measures. The Mahalanobis distance from x to group t can be calculated as:

$$M = ((x - m_t)' S_t^{-1} (x - m_t))^{1/2}$$

Where M is the generalized distance of each pixel from the t group; $S_t$ represents the within-group covariance matrix covariance matrix; $m_t$ is the p-dimensional vector for the principal components based upon the references (e.g. the risk-free points); and x is a p-dimensional vector for the principal components based upon for the disparity indices.

Figure 18:
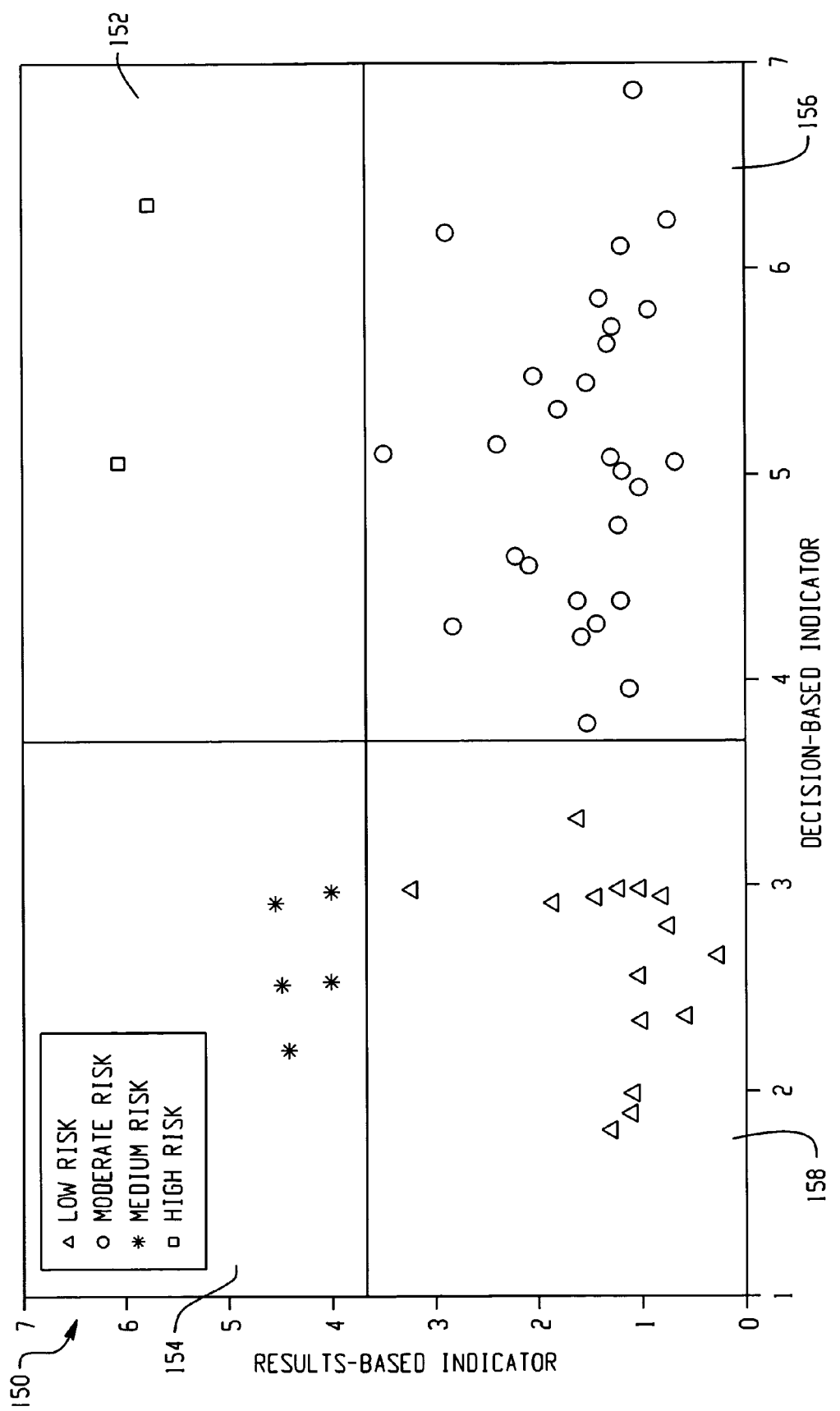
FIG. 18 depicts a graph plotting singular indicators for a plurality of groupings.

In the case where there are two different types of singular indicators (e.g., results-based indicator and decision-based indicator), the singular indicators for each MSA or other grouping under consideration may be plotted and divided into four quadrants, as illustrated in FIG. 18. In the example of FIG. 18, a graph 150 is shown having a horizontal axis that represents decision-based indicators and a vertical axis that represents results-based indicators. The points plotted on the graph 150 are the combination of the decision-based and results-based indicators for each MSA (or other grouping) under consideration in the lending analysis. The degree of risk associated with each MSA may be classified according to the quadrants, with the upper right quadrant 152 representing high risk, the upper left quadrant 154 representing medium risk, the lower right quadrant 156 representing moderate risk, and the lower left quadrant 158 representing low risk.

The high risk quadrant 152 (high lending disparity and high risk disparity) captures the classes (e.g. MSAs, States, etc.) with both high decision-based indices and high results-based indices. For example, this may indicate that a minority applicant has a lower default risk relatively to the non-minority group (the control) but is charged with high rate spread or is more likely to be denied for a loan. Therefore the high risk quadrant 152 represents the highest lending and risk disparities and should be the main focus of the analysis.

The medium risk quadrant 154 (high lending disparity and low risk disparity) captures the classes (e.g. MSAs, States, etc.) with high results-based indices and medium to low decision-based indices. For example, this may represent the classes in which a minority applicant has an equal default risk relatively to the non-minority group (the control) but is charged with higher rate or is more likely to be denied for a loan. Therefore the medium risk quadrant 154 contains the classes/groups with medium lending risk The moderate risk quadrant 156 (low lending disparity and high risk disparity) captures the classes (e.g. MSAs, States, etc.) with low results-based indices and medium to low decision-based indices. For example, this may represent the classes in which a minority applicant has a lower default risk relatively to the non-minority group (the control) and is charged with similar or lower rate or is or less likely equally to be denied for a loan. Therefore the moderate risk quadrant 156 contains the classes/groups with moderate or low lending risk.

The low risk quadrant 158 (low lending disparity and low risk disparity) captures the classes (e.g. MSAs, States, etc.) with low results-based indices and medium to low decision-based indices. For example, this may represent the classes in which a minority applicant has a higher or equal default risk relative to the non-minority group (the control) and is charged with similar rate or is equally to be denied for a loan. Therefore the low risk quadrant 158 contains the classes/groups with low or no lending risk.

With reference again to FIG. 16, the global indicator sub-module 148 is used to combine the singular indicators for each grouping (e.g., MSA) into a global indicator. In one example, the global indicator may be calculated using a Euclidean distance formula, which represents the squared root of the sum of distance between a class and the reference point:

$$D = [\Sigma (x_i - x_0)^2)]^{1/2}$$

In another example, a weighted average approach may be used to calculate the global indicator. For example, the lending disparity indicator and risk disparity indicator may be given different weights, which may be determined based on different factors. For instance, one of the risk disparity indicator or the lending disparity indicator can be assigned with a smaller weight if it contains fewer factors or indices, or the data quality is less dependable.

Figure 19:
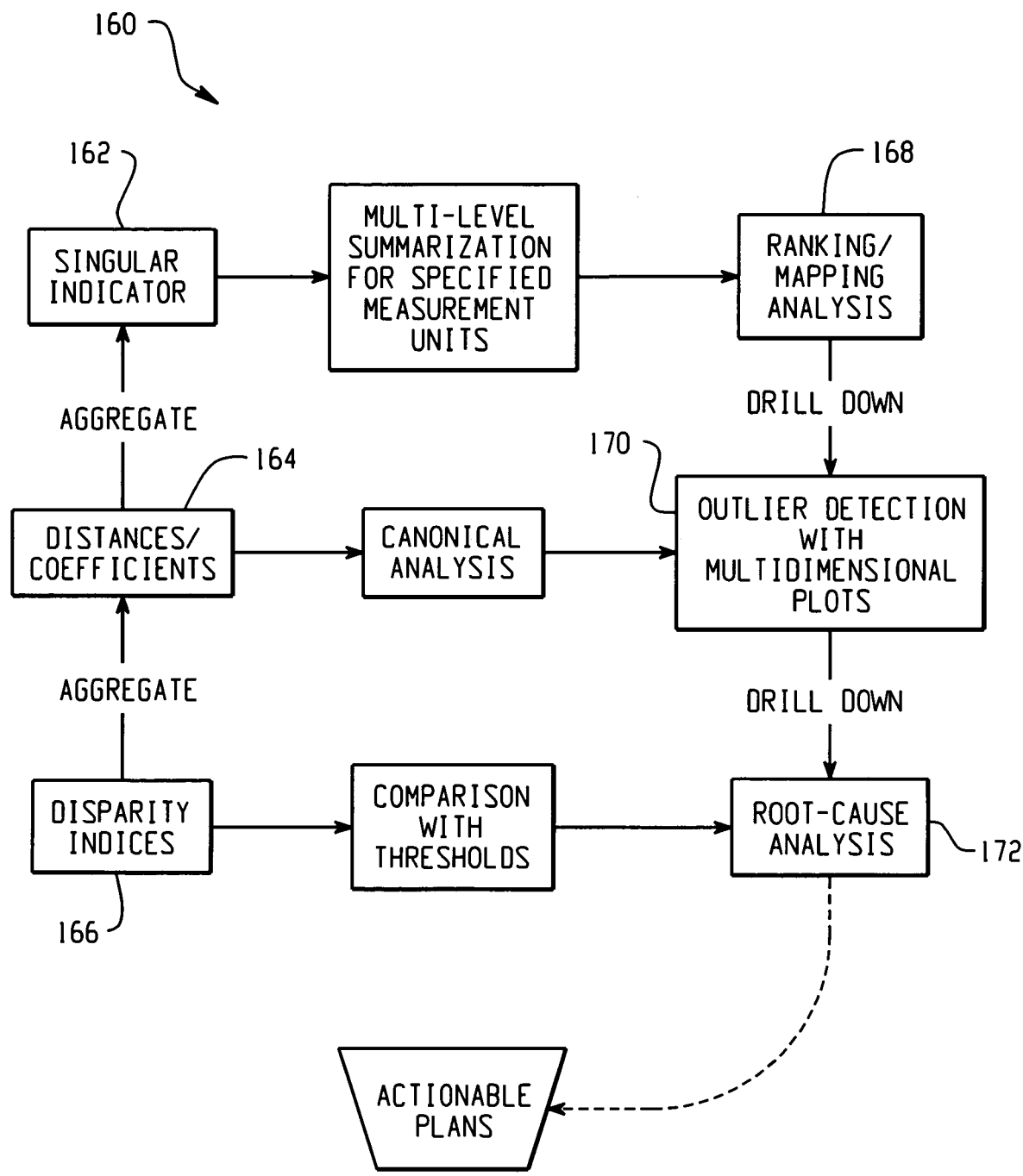
FIG. 19 is a functional block diagram of an example visualization module.

FIG. 19 is a functional block diagram of an example visualization module 160. The visualization module 160 is used to provide a user interface to display and analyze the fair lending analysis data. In addition to displaying the global indicator, the visualization module 160 may also be used to display and analyze data at other levels, such as the singular indicator level 162, the coefficient level 164, and the disparity index level 166. Example functions which may be performed by the visualization module 160 are a ranking and/or mapping analysis 168, outlier detection 170, and root-cause analysis 172.

The visualization module 160 may present an iterative process which can start from any point 162, 164, 166, depending on a lender's compliance requirements. Conversion between disparity indices and global indicator may be a continued process until root causes are identified and actionable plans are produced.

A ranking and/or map-oriented analysis 168 may be performed at any level 162, 164, 166, and root causes 172 may be traced for those segments with high risk indicators. Areas with extreme singular indicators (distances) may, for example, be color coded and can be drilled down to find possible root causes and to reveal contributing indices.

Outlier detection 170 may be used to classify the classes/groups based on the square distances calculated, for example, from both lending disparity indices and risk disparity indices so that the sum of the within-quadrant variation may be minimized. A surface contour may be created to better separate the high risk classes from the low risk classes, for example using a Monte Carlo simulation technique based on a set of pre-designated reference points.

FIG. 20 depicts an example table that may be generated by the visualization module 160 to identify the singular indicators (results-based indicator and decision-based indicator) and global indicator calculated for a plurality of groupings (MSAs). In this example, the MSAs are ranked in order according to the value of their global indicators.

Figure 21:
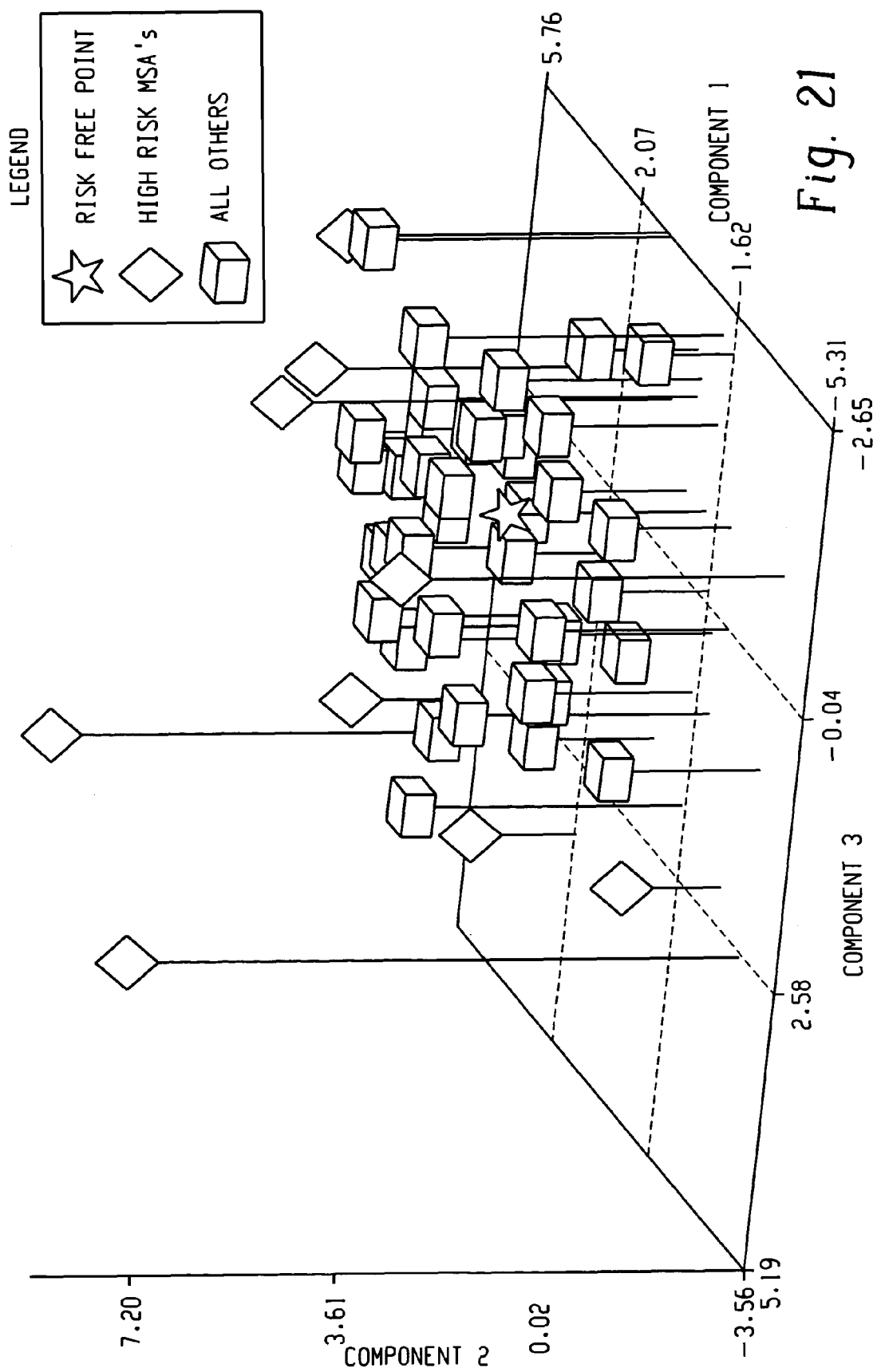
FIG. 21 depicts an example three-dimensional chart that may be generated by the visualization module to help identify extreme indices.

FIG. 21 depicts an example three-dimensional chart that may be generated by the visualization module 160 to help identify extreme indices. The chart may, for example, be used to plot specific (e.g., average) indices by index type for one or more protected classes. For example, the x, y and z axes on the chart may represent index type, index value and protected class, respectively.

FIG. 22 depicts an example table that may be generated by the visualization module 160 to identify the disparity indices contributing to singular indicators. In this example, the disparity indices contributing to the decision-based indicator for each grouping (MSA) are shown in the table.

This written description uses examples to disclose the invention, including the best mode, and also to enable a person skilled in the art to make and use the invention. The patentable scope of the invention may include other examples that occur to those skilled in the art.

It is further noted that the systems and methods described herein may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:

1. A computer-implemented method for analyzing lending data, comprising:
    processing, using one or more processors, loan applicant data into a plurality of applicant groups based on one or more demographic factors;
    selecting one or more control groups from the plurality of applicant groups, each control group having corresponding lending-related data;
    identifying a protected class within the plurality of applicant groups, the protected class having corresponding lending-related data;
    calculating a plurality of disparity indices for the protected class, wherein calculating includes comparing the lending-related data for the protected class with lending-related data for one or more control groups;
    calculating one or more reference indices;
    calculating one or more singular indicators for the protected class, wherein calculating includes converting the plurality of disparity indices and the one or more reference indices into coefficient values, and comparing the coefficient values using one or more distance formulas; and
    calculating a global indicator using a plurality of singular indicators, wherein a global indicator represents a relative comparison amongst groups of singular indicators.

2. The method of claim 1, wherein the global indictor is calculated using a Euclidean distance formula.

3. The method of claim 1, wherein the global indictor is calculated as a weighted average of the plurality of singular indicators.

4. The method of claim 1, wherein a reference index is calculated for each of the plurality of disparity indices.

5. The method of claim 1, wherein the one or more demographic factors include at least one of race, geographic location, gender, income level, color, ethnicity, religion, national origin, marital status, handicap, disability, familial status, age, or receipt of public assistance income.

6. The method of claim 1, wherein the one or more singular indicators are calculated using a distance analysis technique.

7. The method of claim 6, further comprising:
    determining linear coefficients for the plurality of disparity indices and the one or more reference indices; and
    calculating the one or more singular indicators as a difference measure between the linear coefficients for the one or more reference indices and the linear coefficients for the plurality of disparity indices.

8. The method of claim 7, wherein the linear coefficients arc calculated using a multivariate analysis to represent the indices with principal components.

9. The method of claim 8, wherein the one or more singular indicators are Mahalanobis as distance measures.

10. The method of claim 1, wherein the one or more reference indices are calculated using pre-defined criteria.

11. The method of claim 1, wherein the one or more reference indices are calculated using peer or industrial composite data.

12. The method of claim 1, wherein the one or more reference indices are calculated by assuming a value of 1.0 for one or more of the disparity indices.

13. The method of claim 1, wherein the one or more reference indices are calculated using average values for one or more of the disparity indices.

14. The method of claim 1, wherein the one or more reference indices are determined using average values for one or more of the disparity indices across a plurality of lending institutions.

15. The method of claim 1, wherein the one or more reference indices are calculated by assuming a maximum or minimum value for one or more of the disparity indices.

16. The method of claim 1, wherein the one or more reference indices are calculated using simulations.

17. The method of claim 1, further comprising: validating the loan applicant data in one or more of the applicant groups to determine if one or more data fields are missing or outside of an expected range.

18. The method of claim 17, further comprising: replacing data fields that are missing or outside of the expected range with one or more default values.

19. The method of claim 1, wherein the step of processing loan applicant data includes:
    defining a handle to represent an applicant group, wherein the handle is defined based on a plurality of lending-related factors regarding the applicant group.

20. The method of claim 19, wherein the handle is a borrower risk based handle, and wherein the plurality of lending-related factors include at least one of debt-to-income range, loan-to-value ratio range, credit bureau score, and credit history.

21. The method of claim 19, wherein the handle is a transaction based handle, and wherein the plurality of lending-related factors include at least one of pricing option, term to maturity, loan amount tier, and down payment amount.

22. The method of claim 19, wherein the handle is a property-based handle, and wherein the plurality of lending-related factors include at least one of age, type of structure on a property, property location, appraisal method, and flood zone.

23. The method of claim 1, further comprising:
    generating an interface capable of displaying representations of the one or more singular indicators and the plurality of disparity indices.

24. The method of claim 1, wherein at least one of the disparity indices is an origination disparity index, and wherein the origination disparity index is a rate of loan origination for a control group relative to a rate of loan origination for the protected class.

25. The method of claim 1, wherein at least one of the disparity indices is a fallout disparity index, and wherein the fallout disparity index is a rate of loan fallout for the protected class relative to a rate of loan fallout for a control group.

26. The method of claim 1, wherein at least one of the disparity indices is a market penetration index, wherein a control group represents an entire population of a minority group within a geographically defined area, wherein the protected class represents loan applicants of the minority group within the geographically defined area, and wherein the market penetration index is a population size of the minority group within the geographically defined area relative to a loan application rate of the minority group with the geographically defined area.

27. The method of claim 1, wherein at least one of the disparity indices is a product disparity index, and wherein the product disparity index is a rate of granted loans above a set dollar amount for the protected class relative to a rate of granted loans above the set dollar amount for a control group.

28. The method of claim 1, wherein at least one of the disparity indices is a sub-prime product application mix disparity index, the sub-prime product application mix disparity index being calculated as a first ratio divided by a second ratio, the first ratio being a proportion of sub-prime loan applicants of the protected class relative to a total number of loan applications for the protected class, the second ratio being a proportion of sub-prime loan applicants of a control group relative to a total number of loan applications for the control group.

29. The method of claim 1, wherein at least one of the disparity indices is a sub-prime product organization mix disparity index, which is calculated as a first ratio divided by a second ratio, the first ratio being a proportion of sub-prime loans granted to the protected class relative to a total number of loans originated by the protective class, the second ratio being a proportion of sub-prime loans granted to a control group relative to a total number of loans originated by the control group.

30. The method of claim 1, wherein at least one of the disparity indices is a loan-to-value disparity index, which is a proportion of loan applicants in a control group having a loan-to-value greater than a predetermined threshold relative to a proportion of loan applicants in the protected class having a loan-to-value greater than the predetermined threshold.

31. The method of claim 1, wherein at least one of the disparity indices is a bureau score disparity index, which is a ratio of loan applicants in a control group that have a FICO bureau score below a predetermined threshold relative to loan applicant in the protected class that have a FICO bureau score below the predetermined threshold.

32. The method of claim 1, wherein at least one of the disparity indices is an income disparity index, which is a ratio of loan applicants in a control group having an income below a predetermined threshold relative to loan applicants in the protected class having an income below the predetermined threshold.

33. The method of claim 1, further comprising: displaying representations of the one or more singular indicators, the global indicator, and the plurality of disparity indices using a graphical interface, wherein drilling down upon a global indicator reveals one or more single indicators, and wherein drilling down upon a single indicator reveals one or more disparity indices in the plurality of disparity indices.

34. The method of claim 1, wherein singular indicators are grouped by geographical information such as Metropolitan Statistical Area (MSA), state, or channel.

35. The method of claim 1, wherein singular indicators are grouped by loan type or property type.

36. The method of claim 1, wherein singular indicators are grouped by geographical information such as Metropolitan Statistical Area (MSA), state, county, congressional district, neighborhood, zip code, census tract, or census tract grouping including high, middle, moderate, or low income tiers within state or MSA boundaries.

37. The method of claim 1, wherein singular indicators are grouped by loan purpose, loan type, owner occupancy, channel, or property type.

38. The method of claim 1, wherein singular indicators are grouped by organizational information corresponding to an institution, a legal entity/subsidiary, a line of business, a processing center, a branch, a sales office, a channel, an operating unit, or a loan officer.

39. The method of claim 1, wherein singular indicators are grouped by borrower, collateral, or transaction data categorizations including loan-to-value ratio, debt-to-income ratio, amount of liquid assets, savings rate, collateral price volatility, credit history, credit score, handle segment identifier, type of loan pricing, or loan term.

40. A system for analyzing lending data, comprising:

a processor;

a computer-readable storage medium containing software instructions executable on the processor to cause the processor to perform operations including: processing loan applicant data into a plurality of applicant groups based on one or more demographic factors;

selecting one or more control groups from the plurality of applicant groups, each control group having corresponding lending-related data;

identifying a protected class within the plurality of applicant groups, the protected class having corresponding lending-related data;

calculating a plurality of disparity indices for the protected class, wherein calculating includes comparing the lending-related data for the protected class with lending-related data for one or more control groups;

calculating one or more reference indices;

calculating one or more singular indicators for the protected class, wherein calculating includes converting the plurality of disparity indices and the one or more reference indices into coefficient values, and comparing the coefficient values using one or more distance formulas; and calculating a global indicator using a plurality of singular indicators wherein a global indicator represents a relative comparison amongst groups of singular indicators.

41. A computer-readable storage medium encoded with instructions that when executed, cause a computer to perform a method for analyzing lending data, comprising:

processing loan applicant data into a plurality of applicant groups based on one or more demographic factors;

selecting one or more control groups from the plurality of applicant groups, each control group having corresponding lending-related data;

identifying a protected class within the plurality of applicant groups, the protected class having corresponding lending-related data;

calculating a plurality of disparity indices for the protected class, wherein calculating includes comparing the lending-related data for the protected class with lending-related data for one or more control groups;

calculating one or more reference indices;

calculating one or more singular indicators for the protected class, wherein calculating includes converting the plurality of disparity indices and the one or more reference indices into coefficient values, and comparing the coefficient values using one or more distance formulas; and calculating a global indicator using a plurality of singular indicators, wherein a global indicator represents a relative comparison amongst groups of singular indicators.

42. A computer-implemented method for analyzing lending data, comprising:

processing, using one or more processors, loan applicant data into a plurality of applicant groups based on one or more demographic factors;

selecting one or more control groups from the plurality of applicant groups, each control group having corresponding lending-related data;

identifying a protected class within the plurality of applicant groups, the protected class having corresponding lending-related data;

calculating a plurality of disparity indices for the protected class, wherein calculating includes comparing the lending-related data for the protected class with lending-related data for one or more control groups;

calculating one or more reference indices;

calculating one or more singular indicators for the protected class, wherein calculating includes convening the plurality of disparity indices and the with one or more reference indices into coefficient values, and comparing the coefficient values using one or more distance formulas;

calculating a global indicator using a plurality of singular indicators, wherein a global indicator represents a relative comparison amongst groups of singular indicators; and displaying representations of the one or more singular indicators, the global indicator, and the plurality of disparity indices using a graphical interface, wherein drilling down upon a global indicator reveals one or more single indicators, and wherein drilling down upon a single indicator reveals one or more disparity indices in the plurality of disparity indices.

* * * * *

UNITED STATES PATENT AND TRADEMARK OFFICE
CERTIFICATE OF CORRECTION

| | | |
|---|---|---|
| PATENT NO. | : 7,805,345 B2 | Page 1 of 1 |
| APPLICATION NO. | : 11/212289 | |
| DATED | : September 28, 2010 | |
| INVENTOR(S) | : Abrahams et al. | |

It is certified that error appears in the above-identified patent and that said Letters Patent is hereby corrected as shown below:

In column 15, line 27, delete "indictor" and insert -- indicator --.

In column 15, line 29, delete "indictor" and insert -- indicator --.

In column 16, line 6, insert a paragraph after "comprising:".

In column 16, line 10, insert a paragraph after "comprising:".

In column 17, line 33, insert a paragraph after "comprising:".

Signed and Sealed this
Eleventh Day of January, 2011

David J. Kappos
*Director of the United States Patent and Trademark Office*